United States Patent [19] 455/12

LaMarche et al.

[11] 3,721,767

[45] March 20, 1973

[54] DELAY COMPENSATION IN MULTIPLEX TRANSMISSION SYSTEMS

[75] Inventors: Robert Ernest LaMarche, Atlantic Highlands; Carl Jerome May, Jr., Holmdel; Charles William Rosenthal, Short Hills; Frederick Alan Saal, Colts Neck, all of N.J.

[73] Assignee: Bell Telephone Laboratories, Incorporated, Murray Hill, N.J.

[22] Filed: Dec. 28, 1971

[21] Appl. No.: 212,920

[52] U.S. Cl. .................................... 179/15 AS, 325/4

[51] Int. Cl. ........................................... H04j 5/00

[58] Field of Search ......... 325/4; 179/15 AQ, 15 BS, 179/15 AS, 15 BY

[56] References Cited

UNITED STATES PATENTS

| | | | |
|---|---|---|---|
| 3,611,435 | 10/1971 | Cooper | 325/4 |
| 3,634,628 | 1/1972 | Sekimoto | 179/15 BS |
| 3,644,680 | 2/1972 | Amano | 179/15 AS |
| 3,681,533 | 8/1972 | Long | 179/15 AS |

*Primary Examiner*—Ralph D. Blakeslee
*Attorney*—R. J. Guenther et al.

[57] ABSTRACT

A time assignment speech interpolation system is disclosed utilizing time-shared common control processing circuits. Speech signals from a plurality of trunks are interpolated on a lesser plurality of transmission channels by connecting trunks only during active periods. In order to accommodate transmission channels of varying delay times (e.g., cable and satellite channels), receiving terminal switching operations are delayed for a time corresponding to the transmission delay of the corresponding channel. This is implemented by common control digital delay time-out for each new connection.

12 Claims, 21 Drawing Figures

CLOCK AND TIMING CIRCUIT

CLOCK PULSES

TIMING DIAGRAM

GENERAL PURPOSE STORAGE REGISTER

GENERAL PURPOSE CONTROL REGISTER

FLIP/FLOP

TRUNK STORES
(400 TIME SLOTS)

BUFFER STORES
(100 TIME SLOTS)

GATE STORES
(100 TIME SLOTS)

TRANSMITTING SWITCH

RECEIVING SWITCH

AUXILIARY GATE TIMING

RECEIVE CONNECTION DATA

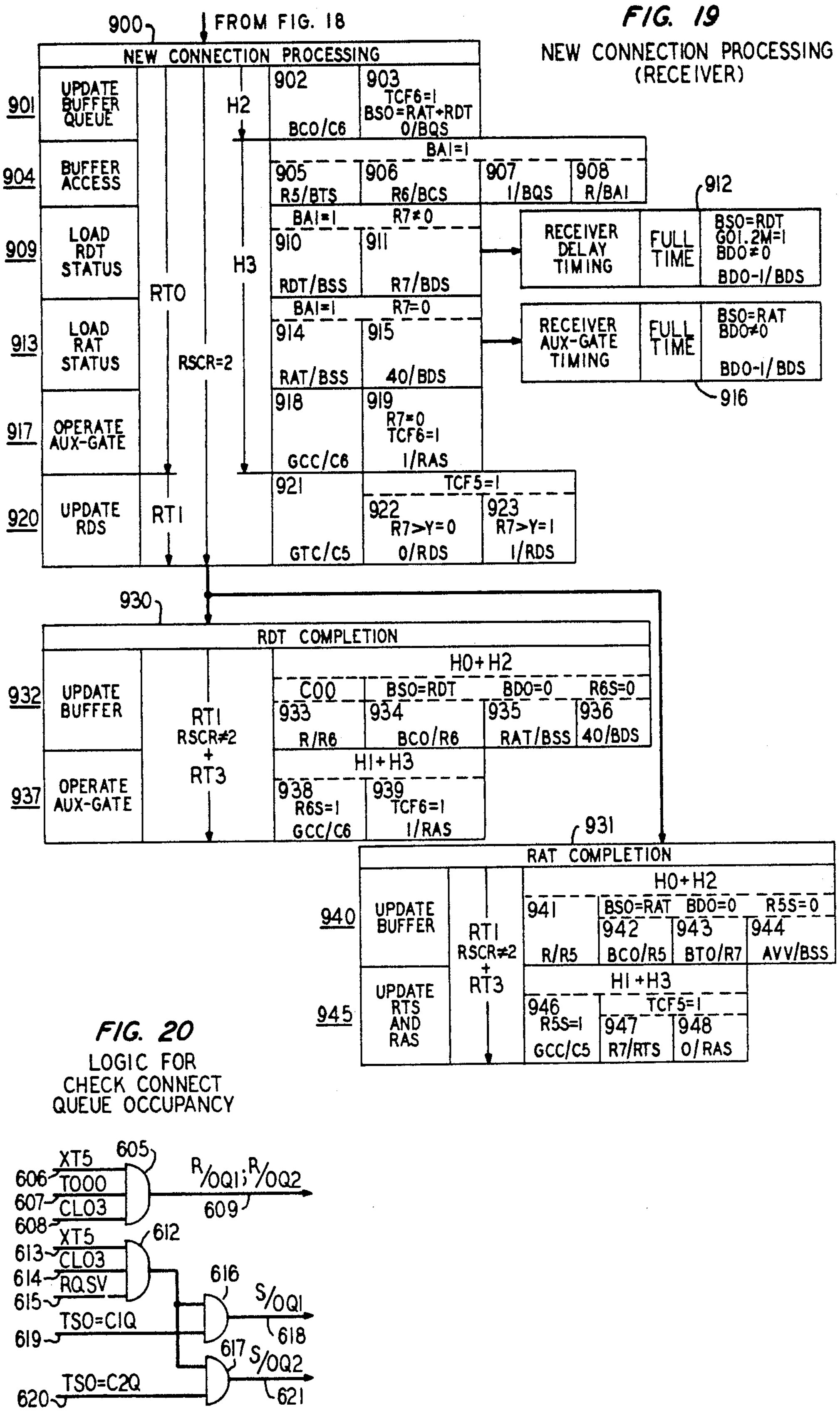
FIG. 19 NEW CONNECTION PROCESSING (RECEIVER), FIG. 20 LOGIC FOR CHECK CONNECT QUEUE OCCUPANCY

DELAY COMPENSATION IN MULTIPLEX TRANSMISSION SYSTEMS

BACKGROUND OF THE INVENTION

1. Field of the Invention

This invention relates to multiplex signal transmission systems and, more particularly, to multiplexed signal interpolation systems.

2. Description of the Prior Art

It is known to utilize transmission capacity more efficiently by interpolating signals from different sources on the same transmission channel, taking a channel away from a source not currently using it and giving that channel to a source currently requesting service. An example of such a system is the time assignment speech interpolation (TASI) system disclosed in A. R. Kolding et al. U.S. Pat. No. 2,957,946, granted Oct. 25, 1960. Such systems depend upon having a sufficient number of signal sources so as to take advantage of the statistical properties of signal utterances from each source. Telephone conversations, of course, have such properties and can be interpolated in the manner taught in the Kolding patent.

Such speech interpolation systems were originally designed for channels of a transatlantic cable wherein all channels were subjected to essentially identical delays. It is currently common, however, to utilize channels derived by way of communications satellites. Such channels need not necessarily have the same transmission delays and, moreover, the system might well include a mixture of cable channels together with satellite channels and thus involve mixtures of transmission channels having radically different delays.

The subjective degradations introduced by such delay variances can be minimized by minimizing the amount of delay variation in successive transmissions. A technique for accomplishing this is disclosed in a copending application of N. G. Long and C. J. May, Jr. (Case 4-5), Ser. No. 844,379, filed July 24, 1969 and assigned to applicants' assignee. This system, however, merely minimizes the delay variations based on channel availability and does not guarantee identical delays for successive signal bursts. Such delay variation gives rise to the possibility of a signal being delivered to the wrong recipient because it arrived prior to or later than the instruction to change the connection.

It has been common in the prior art to avoid these delay anomalies by padding out the delay of all transmission channels so as to make all delays relatively equal. This has the obvious disadvantages of requiring expensive delay elements and of maximizing the delay in all channels.

SUMMARY OF THE INVENTION

In accordance with the present invention, excessive delays, cross connections and signal clips are avoided by delaying each connection until the appropriate signal burst arrives at the receiver. This can be accomplished by maintaining a record of the relative delays of each transmission channel at the receiver, and, each time a connection is to be made to a channel, introducing a delay equal to that channel's relative delay. This scheme obviates the necessity for expensive padding delays and minimizes the average delay in all signal paths. At the same time, this technique prevents signal bursts from being delivered to unintended recipients or from being lost to intended recipients.

These and other objects and features, the nature of the present invention and its various advantages will be more readily understood upon consideration of the attached drawings and of the following description of the drawings.

BRIEF DESCRIPTION OF THE DRAWINGS

In the drawings:

FIG. 19 is a flow or sequence chart of the new connection processing (receiver) process used by circuits of the interpolation system of FIG. 1; and FIG. 20 is a schematic circuit diagram of the detailed logic used by the check connect queue occupancy function of the flow chart of FIG. 14.

DETAILED DESCRIPTION

Figure 1:
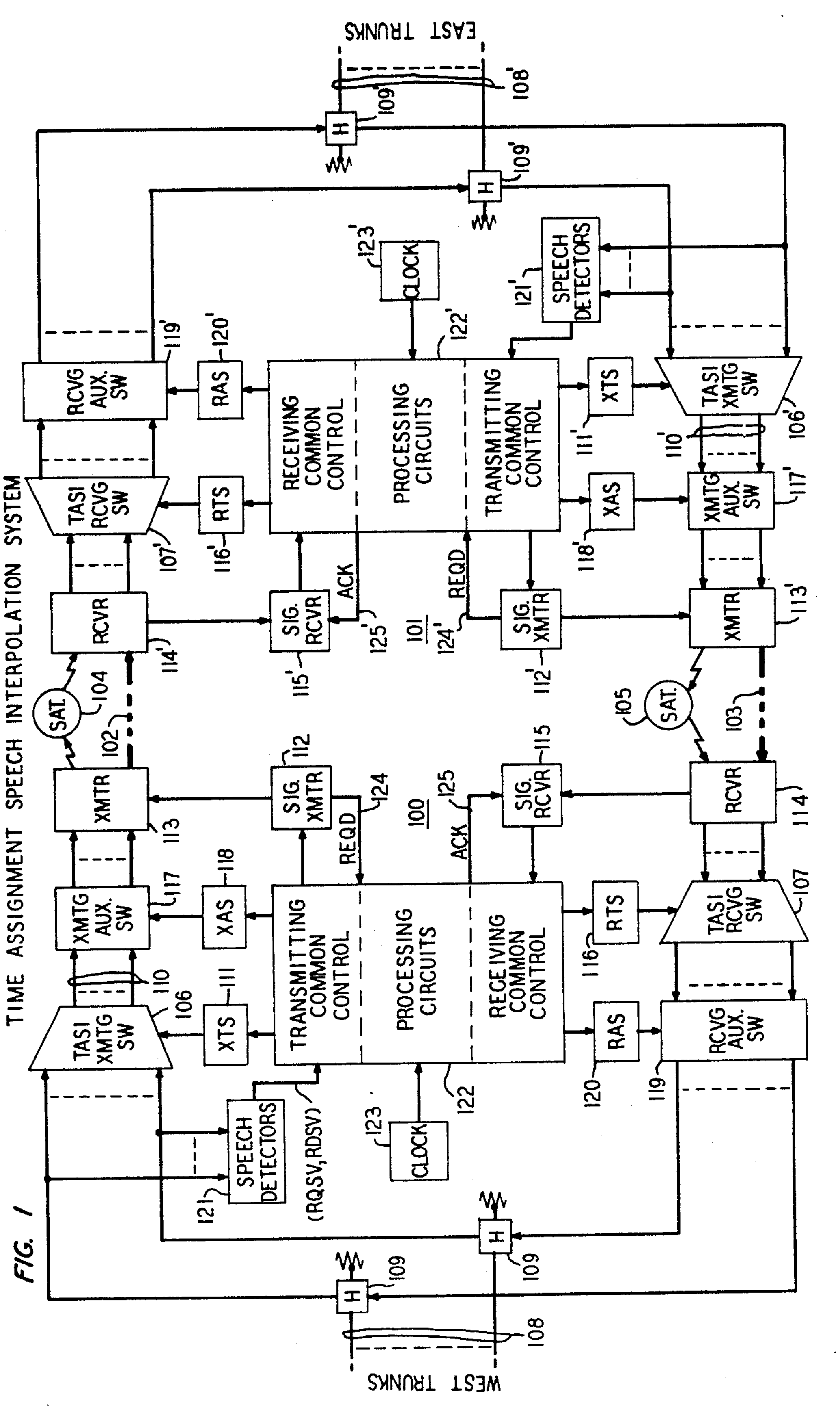
FIG. 1 is a general block diagram of a time assignment speech interpolation system suitable for utilizing the principles of the present invention.

FIG. 1 is a general block diagram of a TASI system. As illustrated, two terminals 100 and 101 are required, each terminal generally comprising transmitting circuits, receiving circuits and common processing equipment. Terminals 100 and 101 are identical and are interconnected by both land or undersea cable circuits 102 and 103, as well as satellite circuits 104 and 105. Circuits 102 and 104 connect terminals 101 and 102 in one direction, while circuits 103 and 105 connect these terminals in the opposite direction. Since terminals 100 and 101 are identical, only terminal 100 will be described in detail. Corresponding elements of terminal 101 will be identified with the same reference numeral, primed.

A TASI transmitting switch 106 and a TASI receiving switch 107' are required to interpolate the transmitted speech from trunks 108 to and from the remote terminal. Hybrid circuits 109 separate the transmitted and received speech signals.

Transmitting switch 106 interpolates speech from a plurality of trunks 108 on to a lesser plurality of transmitting channels 110 by connecting newly active trunks to currently available channels. Transmitting switch 106 is under the control of a transmitting trunk store 111 which records the current assignment of trunks to transmission channels. These assignments are transmitted to the remote terminal by way of a signaling transmitter 112, which is connected to special control channels by way of a transmitter 113. These assignments are separated by receiver 114 and detected by signaling receiver 115 to duplicate the assignments in receiving trunk switch 116'. Transmitter 113 and receiver 114 may be conventional data transmission devices.

In order to prevent audible "clicks" when connections are changed, a transmitting auxiliary switch 117 is provided under the control of transmitting auxiliary store 118, which operates slowly and thus masks out the audible "click." A receiving auxiliary switch 119', under the control of a receiving auxiliary store 120', performs a similar function at the remote terminal.

A speech detecting circuit 121 detects speech appearing on any one of input trunks 108 and relays control signals indicating such speech to processing circuits 122. In particular, speech detectors 121 provide a Request for Service (RQSV) signal for each trunk requesting service and an Enable Disconnect If Service (EDSV) signal for each trunk no longer requiring service. Processing circuits 122, under the control of clock circuit 123, perform the necessary processing to control the assignment of channels to trunks in response to speech detector output signals and currently existing assignments.

Signaling transmitter 112 indicates when it is available for signaling new assignments by a REQD Request Data signal on lead 124. Signals received by processing circuits 112' from signaling receiver 115' are acknowledged by a signal on ACK Acknowledge lead 125'.

A common control speech detector suitable for the time assignment speech interpolation system of FIG. 1 is disclosed in C. J. May, Jr., U.S. Pat. No. 3,520,999, granted July 21, 1970 and assigned to applicants' assignee.

Clock and Timing Circuits

Figure 2:
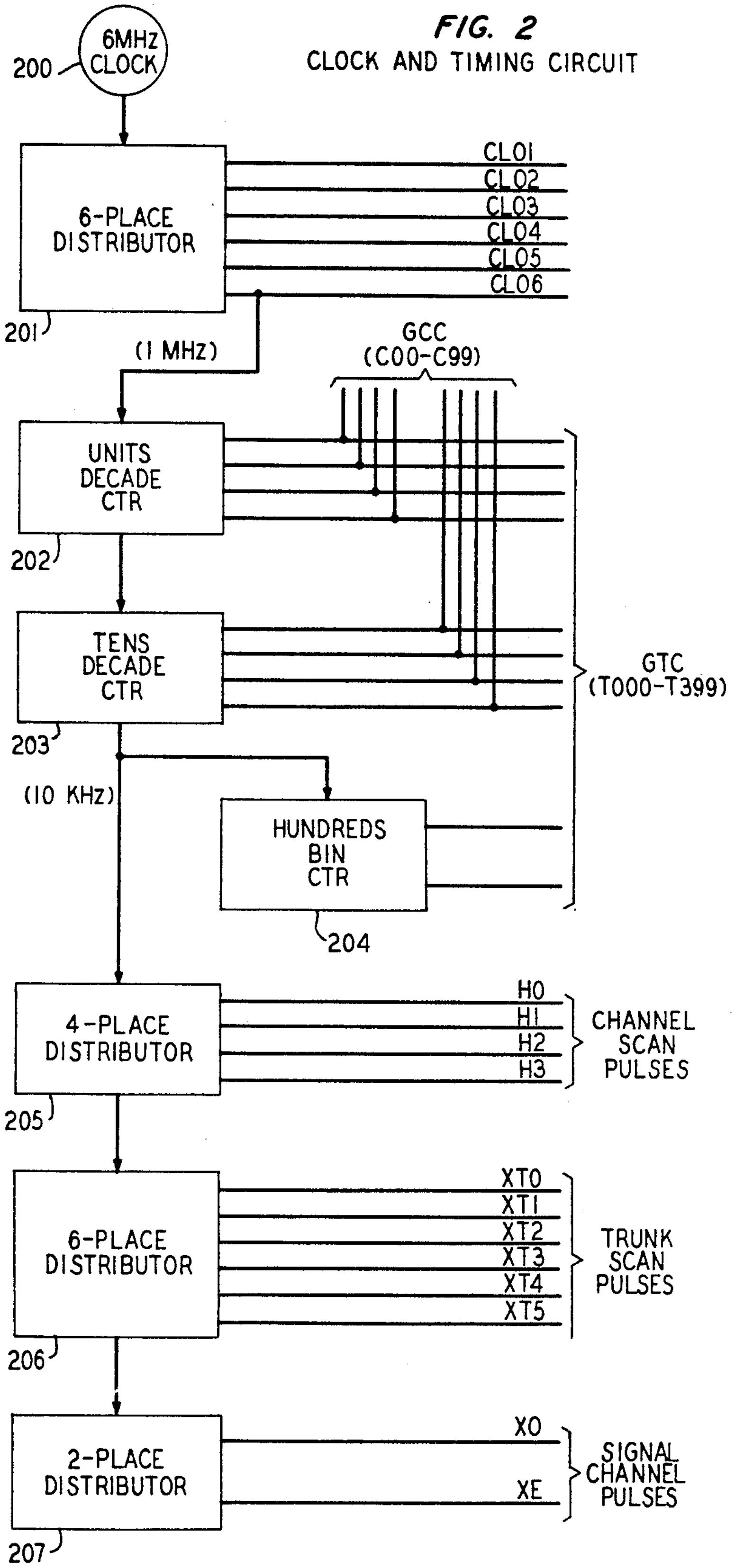
FIG. 2 is a block diagram of a clock and timing circuit suitable for use in the interpolation system of FIG. 1.

As illustrated in FIG. 1, each of the processing circuits 122 and 122' is under the control of a timing circuit 123 or 123', respectively. In FIG. 2, there is shown a schematic diagram of a clock circuit suitable for this purpose. A crystal-controlled clock source 200 drives a pulse distributor 201, which may comprise a ring counter, to divide the pulse train from clock 200 into six equally-spaced clock phases, identified in FIG. 2 as CL01 through CL06. The output of clock 200 is illustrated in FIG. 3(a), while the clock phases are illustrated in FIGS. 3(b) through 3(g).

The final clock phase from distributor 201 is used to drive a decade counter 202, the overflow from which is used to advance a second decade counter 203. Decade counter 203 comprises the tens digit position while counter 202 provides the units digit position for a two-digit generated channel code (GCC), identified in FIG. 2 as C00 through C99. These generated channel codes correspond to the available channels in the transmission facilities connecting transmitter 113 to receiver 114' in FIG. 1. Pulses appearing in each numbered channel timeslot C00 through C99 are as illustrated in FIGS. 3(h) through 3(j).

A timing pulse spanning the entire sequence from C00 to C99 is shown in FIG. 3(k). This pulse, identified as the H0 channel scanning pulse, is 100 microseconds long since each of the channel pulses C00 through C99 is 1 microsecond long.

The overflow from tens decade counter 203 is applied to hundreds counter 204. Since only four hundreds need be counted, counter 204 is merely a binary counter having two stages. The outputs of counters 202, 203 and 204 provide a binary coded decimal number identifying each of the trunks 108 in FIG. 1. The codes thereby generated are called the generated trunk codes (GTC) and are identified as T000 through T399. This can be seen in FIGS. 3(h) through 3(j). These trunk codes are each spanned by a trunk scanning pulse, 400 microseconds long, coinciding with four successive channel scanning pulses. The trunk pulses are identified as T000 to T399, and correspond to four successive channel cycles. This arrangement is illustrated in FIG. 4 where the H0 H1, H2 and H3 pulses of FIGS. 4(a) through 4(d) correspond to successive channel scanning cycles, while the XT0 pulse shown in FIG. 4(e) bridges this entire cycle. The XT0 pulse, of course, corresponds to a complete trunk scanning cycle which is 400 microseconds in length.

Six successive trunk scanning cycles shown in FIGS. 4(e) through 4(j) comprise a signaling cycle shown in FIG. 4(k) as an XO pulse having a 2.4 millisecond duration. This is the odd signaling cycle and there is a corresponding XE even signaling cycle shown in FIG. 4 and also having a 2.4 millisecond duration. Even and odd signaling cycles succeed each other alternately.

Figure 3:
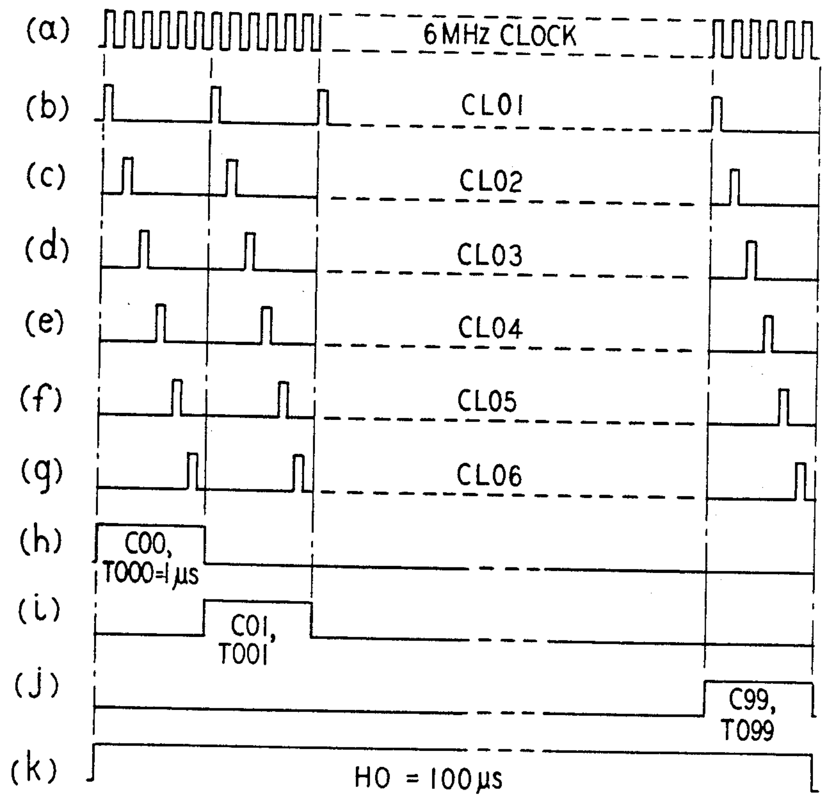
FIGS. 3 and 4 are graphical representations of timing pulses provided by the circuits of FIG. 2.
Figure 4:
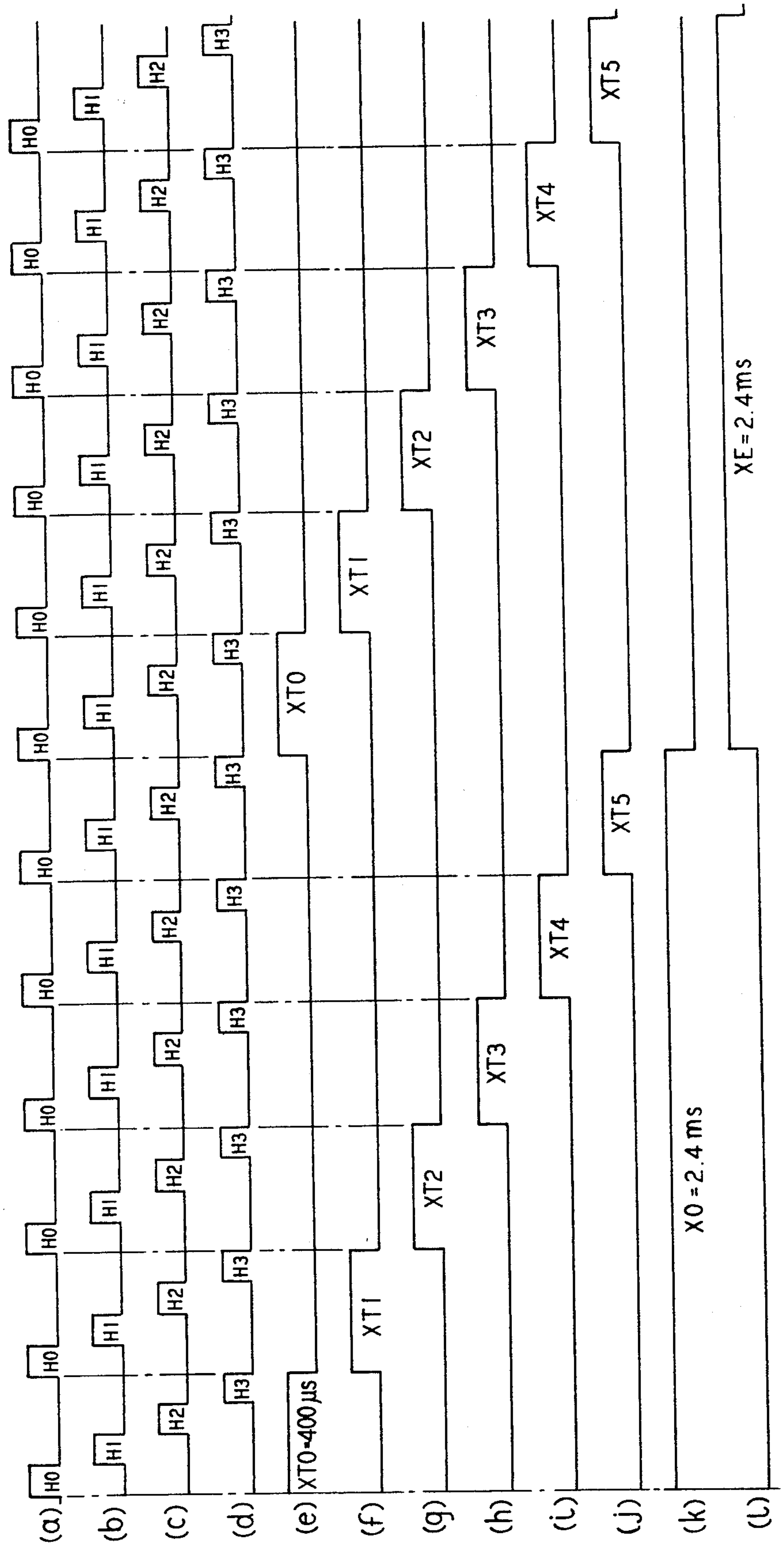

The timing intervals illustrated in FIGS. 3 and 4 are utilized throughout the TASI system for timing purposes. They will hereinafter be identified simply by the lead identifications shown in FIG. 2.

General Purpose Registers

Figure 5:
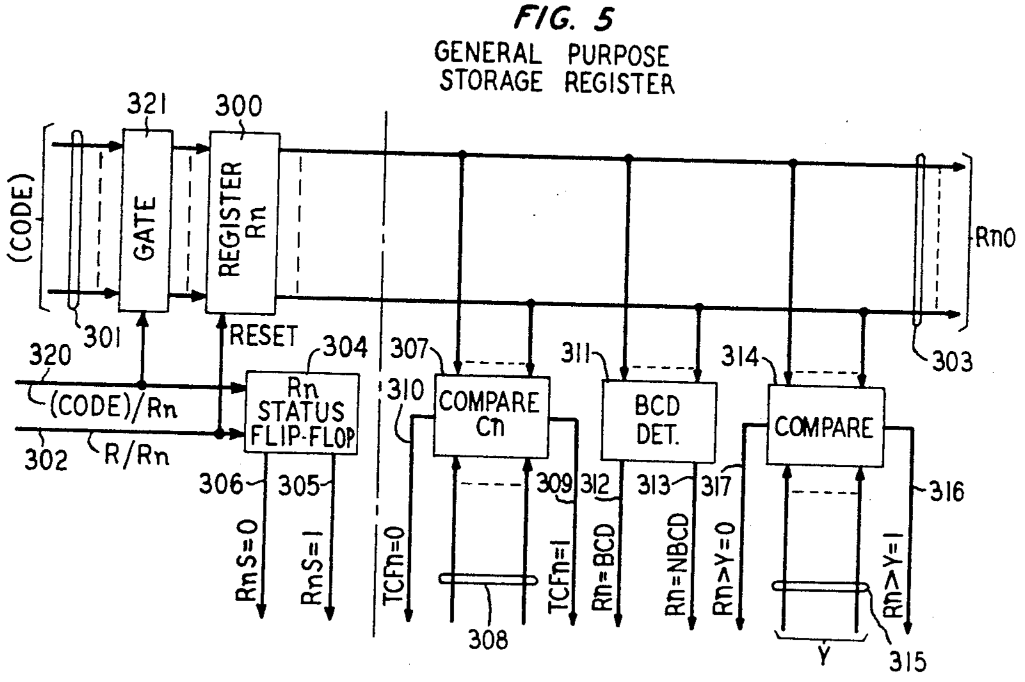
FIG. 5 is a block diagram of a general purpose storage register suitable for use in the interpolation system of FIG. 1.

In FIG. 5 there is shown a block diagram of a general purpose storage register 300 suitable for storing ten-bit codes arriving on input leads 301. Register 300 is identified as register R*n* to indicate that the plurality of such registers are available. Indeed, in the embodiment of FIG. 1, seven such registers are utilized. Register 300 is loaded by a signal ((code)/R*n*) on lead 320 to operate gate 321. A gate similar to gate 321 is provided for each different source of coded signals to be loaded into register 300. Register 300 may be reset to the allzeros condition by a reset signal on lead 302, identified as "R/R$n$".

A status flip-flop 304 is provided to indicate the presence of a valid code in register 300. This flip-flop is set for a command (code)/R$n$ on lead 320 which loads a code into R$n$ register 300. An (R$n$S=1) output signal is provided on lead 305. When the register is reset by a signal on lead 302 (R/R$n$), a (R$n$S=0) output signal appears on lead 306.

The output of register 300 appears on output leads 303 to which are attached various detection circuits as follows:

A compare circuit 307 is provided to compare the output of register 300 with the code appearing on leads 308. If these codes are identical, an output (TCF$n$=1) appears on lead 309; otherwise, an output (TCF$n$=0) appears on lead 310.

A binary coded decimal (BCD) detector 311 is provided to detect whether or not the code stored in register 300 is a binary coded decimal code. The code is assumed to be a binary coded decimal code if all of the decimal positions are equal to or less than nine. When this is true, an output signal (R$n$=BCD) appears on lead 312. If either of the decimal positions exceeds the value of nine, the stored code cannot be binary coded decimal information and an output signal (R$n$=NBCD) appears on lead 313.

A compare circuit 314 is provided which compares the output of register 300 with a code Y appearing on lead 315. If the output of register 300 is greater than the code Y on lead 315, a signal (R$n$>Y=1) is provided on output lead 316; otherwise, a signal (R$n$>Y=0) appears on lead 317.

As previously indicated, a plurality of general purpose storage registers such as that disclosed in FIG. 5 are provided for the processing circuits of FIG. 1. The input codes to these registers are gated from the various other processing circuits while the output from register 300 is delivered to such processing circuits. These registers serve as general purpose asynchronous storage mechanisms for coded information during the processing sequence.

Figure 6:
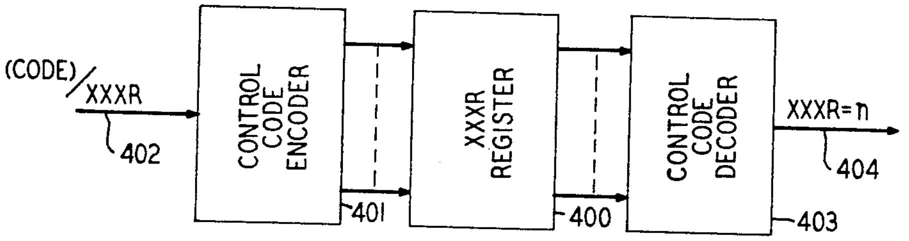
FIG. 6 is a block diagram of a general purpose control register suitable for use in the interpolation system of FIG. 1.

In FIG. 6 there is shown a general purpose control register 400 capable of storing a plurality of binary bits. Control register 400 is utilized to record the current state of processing of the various subfunctions necessary to make interconnections in the time assignment speech interpolation system of FIG. 1.

A control code encoder 401 translates an input signal on one of a plurality of input leads 402 into a corresponding binary code for storage in register 400. Conversely, a control code decoder 403 is provided to decode the binary output codes from register 400 to provide a signal on one-out-of-$n$ output leads 404.

In general, the control register of FIG. 6, six of which are required, store in coded form the current step of a particular subfunction which must be asynchronously performed. The codes in register 400 cycle through the various steps in response to asynchronous input signals on inputs 402. The output signals to leads 404 serve to control the execution of the current steps.

Figure 7:
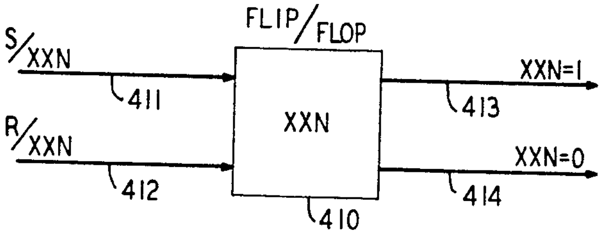
FIG. 7 is a schematic block diagram of a flip-flop circuit suitable for use in the interpolation system of FIG. 1.

In FIG. 7 there is shown a general purpose flip-flop circuit 410 which is set to its "1" state by signals on lead 411 and reset to its "0" state by signals on lead 412. When in its "1" state, flip-flop 410 produces an output (XXN=1) on lead 413 and while in its "0" state produces an output (XXN=0) on lead 414. Each of the circuits of FIGS. 5, 6 and 7 may comprise conventional semiconductor integrated circuits.

Storage Units

The processing circuits of FIG. 1 require a number of storage units for storing information concerning existing or contemplated interconnections of trunks and channels. These storage devices will be described in general in connection with FIGS. 8 through 11.

Figure 8:
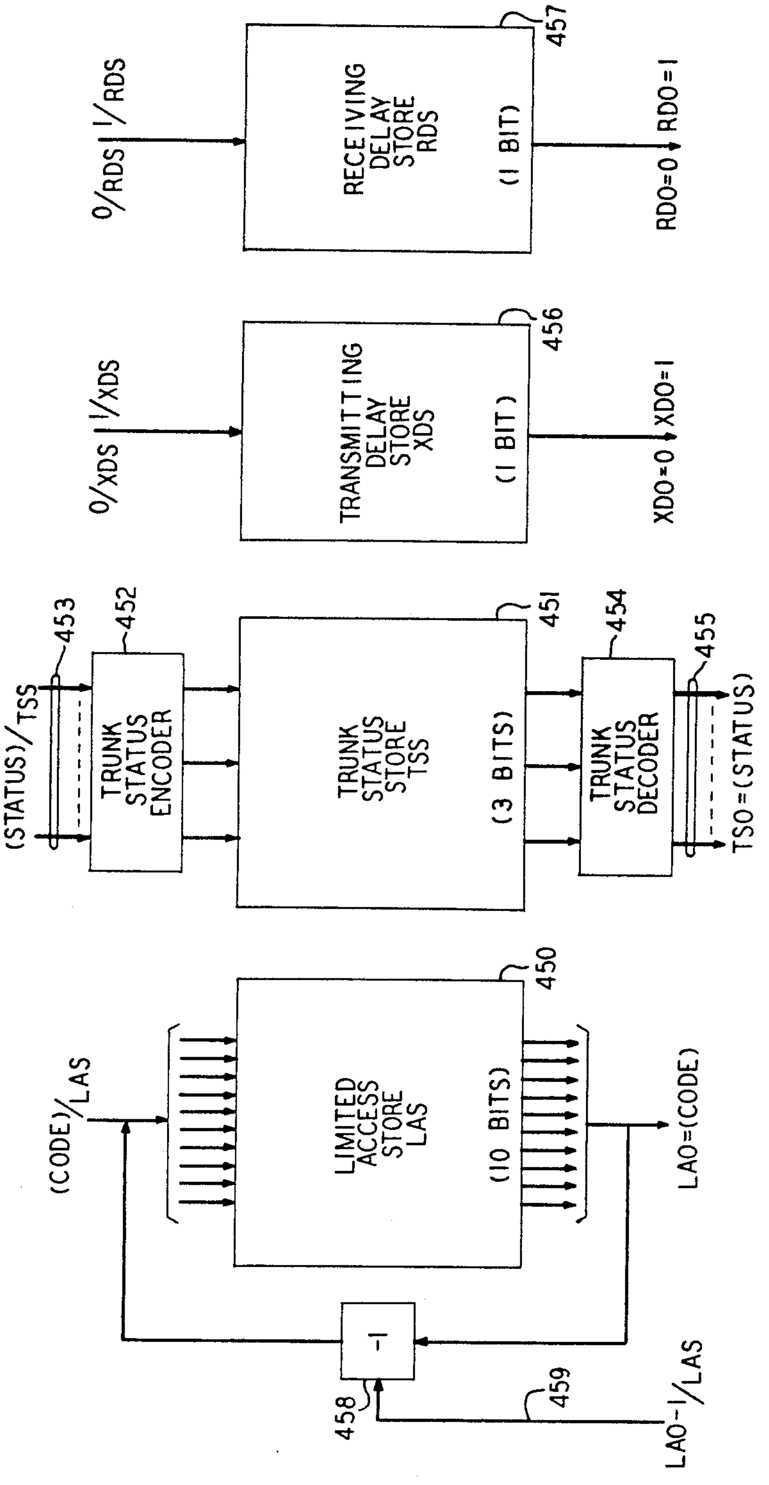
FIG. 8 is a block diagram of the trunk stores suitable for use in the interpolation system of FIG. 1.

In FIG. 8 there is shown the trunk stores which may be used with the Time Assignment Speech Interpolation (TASI) system of FIG. 1. These stores, which may, for example, comprise MOS integrated circuit shift registers or, alternatively, delay line loops, are digital storage mechanisms. Each store in FIG. 8 has a length of 400 stages or positions through which binary information is moved, one position at a time for each timeslot shown in FIGS. 3(h) through 3(j). A plurality of such shift registers or delay lines is provided, one for each bit of a multi-bit binary word to be stored in the device. Controls are available to write new codes into the stores, erase codes already present in the stores, or recirculate codes leaving the stores.

As an example, the Limited Access Store (LAS) 450 in FIG. 8 utilizes 10 bits and hence includes 10 shift registers in parallel, each register being 400 stages long. The Limited Access Store 450 may advantageously comprise the speech detector stores described in the above-mentioned U.S. Pat. No. 3,520,999, granted July 21, 1970 to C. J. May, Jr., one of the present applicants. The Time Assignment Speech Interpolation system of FIG. 1 is capable of interpolating, at the maximum, only approximately 330 trunks on the 100-channel transmission system 102, 104. The balance of the timeslots in LAS store 450 can therefore be used as a scratch-pad memory to store various special codes for later use. A specific description of some of these codes will be provided hereinafter.

In order to better understand the diagrams of FIG. 8, the following observations are noted. The slash is used as part of a command. It indicates that the preceding quantity or value is to be loaded or placed into the succeeding location. Thus, in FIG. 8, the input to LAS store 450 is indicated as "(CODE)/LAS". This indicates that a particular code is to be placed into LAS store 450. Similarly, the output of each store comprises a multi-bit word which, for LAS store 450, is identified as "LAO" (Limited Access Output). A decrementing circuit 458 is provided to decrement the contents of any storage timeslot of LAS store 450, under the control of a decrementing command (LAO–1/LAS) on lead 459 appearing in the appropriate timeslot.

Returning to FIG. 8, a Trunk Status Store (TSS) 451 is provided to store three-bit codes representing the status of each trunk connected to the TASI system of FIG. 1. These codes are derived from the trunk status encoder 452 to which a plurality of input leads 453 are applied. Each of input leads 453 corresponds to one particular status of the trunks. The function of encoder 452 is to convert the one-out-of-eight input signals on leads 453 into a three-bit binary code for insertion in TSS store 451. These codes are synchronized with the generation in FIG. 2 of the trunk codes (GTC) such that the status code stored in the timeslot during which a particular GTC code is generated represents the status of the trunk identified by that GTC code. A status decoder 454 decodes these binary codes and provides status indications (TSO) on output leads 455. In Table I there is given the identifications and descriptions of each trunk status.

TABLE I

Trunk Status Codes (TSS)

| Code | Description |
|---|---|
| TSO = D | Disconnected Trunk |
| SIG | Signaling (Connection in progress) |
| SV | Serviced Trunk |
| C1Q | Connect Group Queue 1 |
| C2Q | Connect Group Queue 2 |
| D1Q | Disconnect Group Queue 1 |
| D2Q | Disconnect Group Queue 2 |
| D3Q | Disconnect Group Queue 3 |

The meaning and use of each of the entries in Table I will be described in further detail hereinafter in connection with a description of the operation of the system of FIG. 1.

In FIG. 8 there is also shown a Transmitting Delay Store (XDS) 456 and a Receiving Delay Store (RDS) 457. Each of these delay stores is also 400 stages long and includes only one bit of storage. This bit is used to store an indication of the type of transmission facility currently connected to the corresponding trunk. A "1", for example, can be used to indicate a satellite transmission channel and a "0" can be used to indicate a submarine cable channel. As will be described in detail hereinafter, this information is used to minimize the delay variations in successive transmissions from the same trunk.

Figure 9:
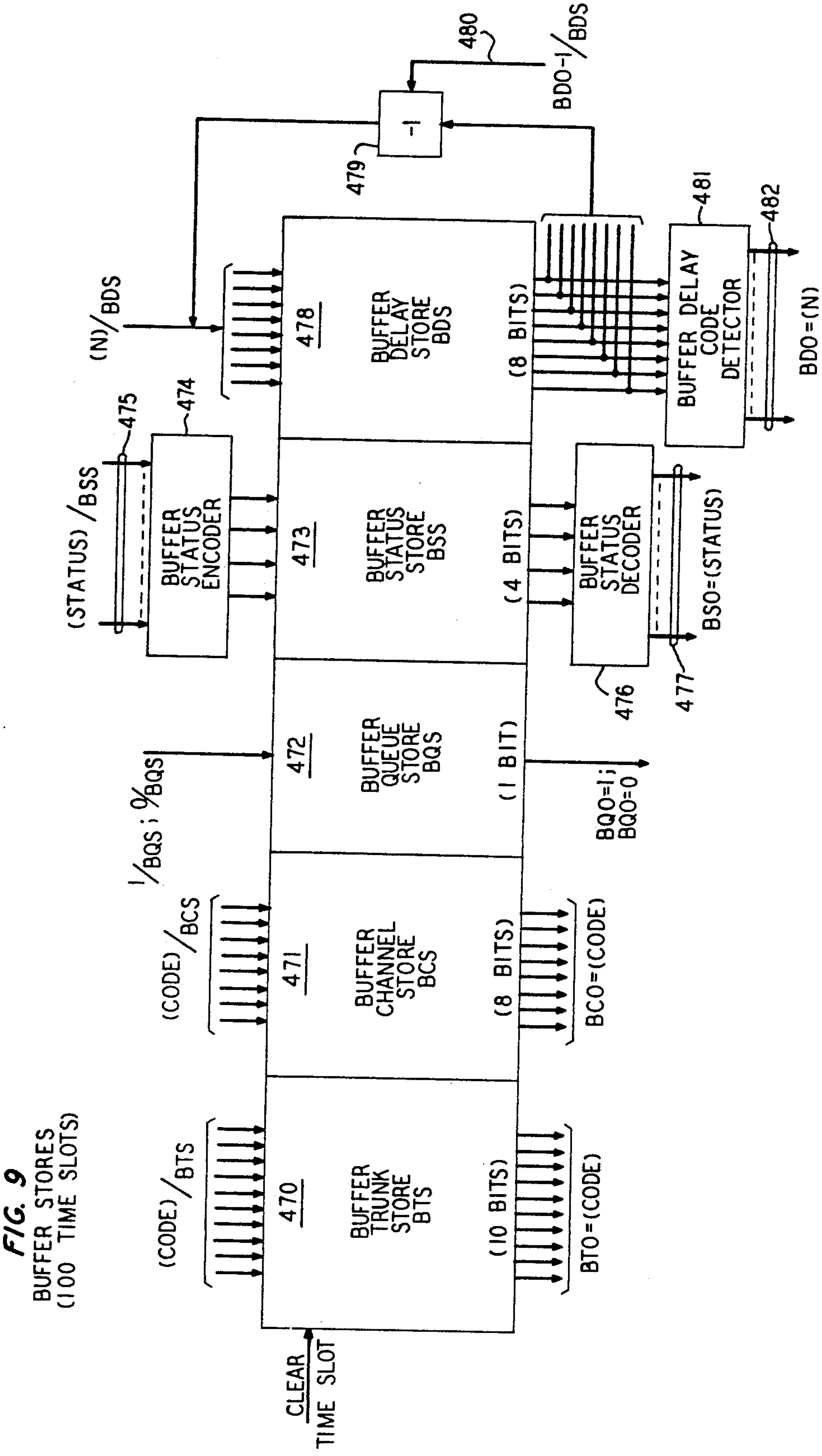
FIG. 9 is a block diagram of the buffer stores suitable for use in the interpolation system of FIG. 1.

In FIG. 9 there is shown a block diagram of a plurality of storage units identified as buffer stores. These storage units are each 100 stages or timeslots in length and hence provide one storage position for each of the 100 transmission channels available in the TASI system of FIG. 1. In general, the buffer stores of FIG. 9 are utilized to temporarily store trunk-channel assignments during preliminary activities prior to the actual connection of the trunk to the channel. Such preliminary actions may include, for example, queueing intervals awaiting available channels, signaling intervals, and the interval required to operate the auxiliary switches 117 and 119 (FIG. 1).

The buffer stores of FIG. 9 include a Buffer Trunk Store (BTS) 470 having 10 bit positions suitable for storing the 10 bits of a trunk code. Also included is a Buffer Channel Store (BCS) 471 including eight bit positions and suitable for storing an identification of one of the 100 transmission channels. The simultaneous storage of a trunk code and a channel code in the same timeslot of stores 470 and 471 forms an assignment of that trunk to that channel. At this stage in the processing, of course, no interconnection actually exists between the trunk and channel and, indeed, the channel may still be assigned to some other trunk. The new assignment merely indicates an intention to connect that trunk to that channel at some future date if all of the necessary preconditions are met.

A Buffer Queue Store (BQS) 472 having a one-bit capacity is provided to indicate the latest assignment of each channel at the receiver. A Buffer Status Store (BSS) 473 having a four-bit capacity is also provided. A buffer status encoder 474 converts signals on one out of 16 input leads 475 into a binary code for storage in store 473. A status decoder 476 translates these binary codes into status signals on output leads 477.

The status codes in store 473 are utilized to indicate which particular timing cycle the associated trunk-channel assignment is currently experiencing. These buffer status codes are indicated in Table II.

TABLE II

Buffer Status Codes (BSS)

| Code | Description |
|---|---|
| BSO = | |
| AVV | Available Timeslot |
| XAT | Transmitter Auxiliary Gate Timing |
| RAT | Receiver Auxiliary Gate Timing |
| CAT | Channel Auxiliary Gate Timing |
| RDT | Receiver Channel Delay Timing |
| CSA | Repeat Connect Signal for Channel A |
| CSB | Repeat Connect Signal for Channel B |
| CDT | Channel Check Channel Delay Timing |
| CNT | Channel Check Channel Noise Timing |
| RSD | Remote Signal (Print or Data) |
| PSO | Priority Signal (Data) |

A more detailed description of each of these status codes and its use in the overall system will be provided hereinafter.

A Buffer Delay Store (BDS) 478 having eight bits is also provided in the buffer store of FIG. 9. The timing of each of the functions represented by the various status codes in store 473 is accomplished by BDS store 478. To accomplish such timing, a particular code is written into the desired timeslot of BDS store 478. At regular intervals thereafter, this code is decremented by "1" in a decrementing circuit 479 and the decremented number reinserted in the same timeslot in store 478. Commands to decrement a particular code appear on lead 480 synchronized in the time-slot in which the code to be decremented appears. A buffer delay code detector 481 detects particular values of the BDS codes and provides indications thereof on output leads 482. In particular, detector 481 can detect an all-zeroes code, indicating that a particular initial value stored in BDS store 478 has been decremented all the way to zero, thus indicating that a corresponding time period has elapsed.

It should be noted that, due to the construction of BDS store 478, each one of 100 different operations can be simultaneously timed merely by assigning them to different timeslots in store 478. That is, 100 different timing codes, all in different timeslots of BDS store 478, can each be decremented separately in its own timeslot by circuit 479. Detector 481 then provides an indication in the appropriate timeslot when the code reaches a desired value (e.g., zero).

Figure 10:
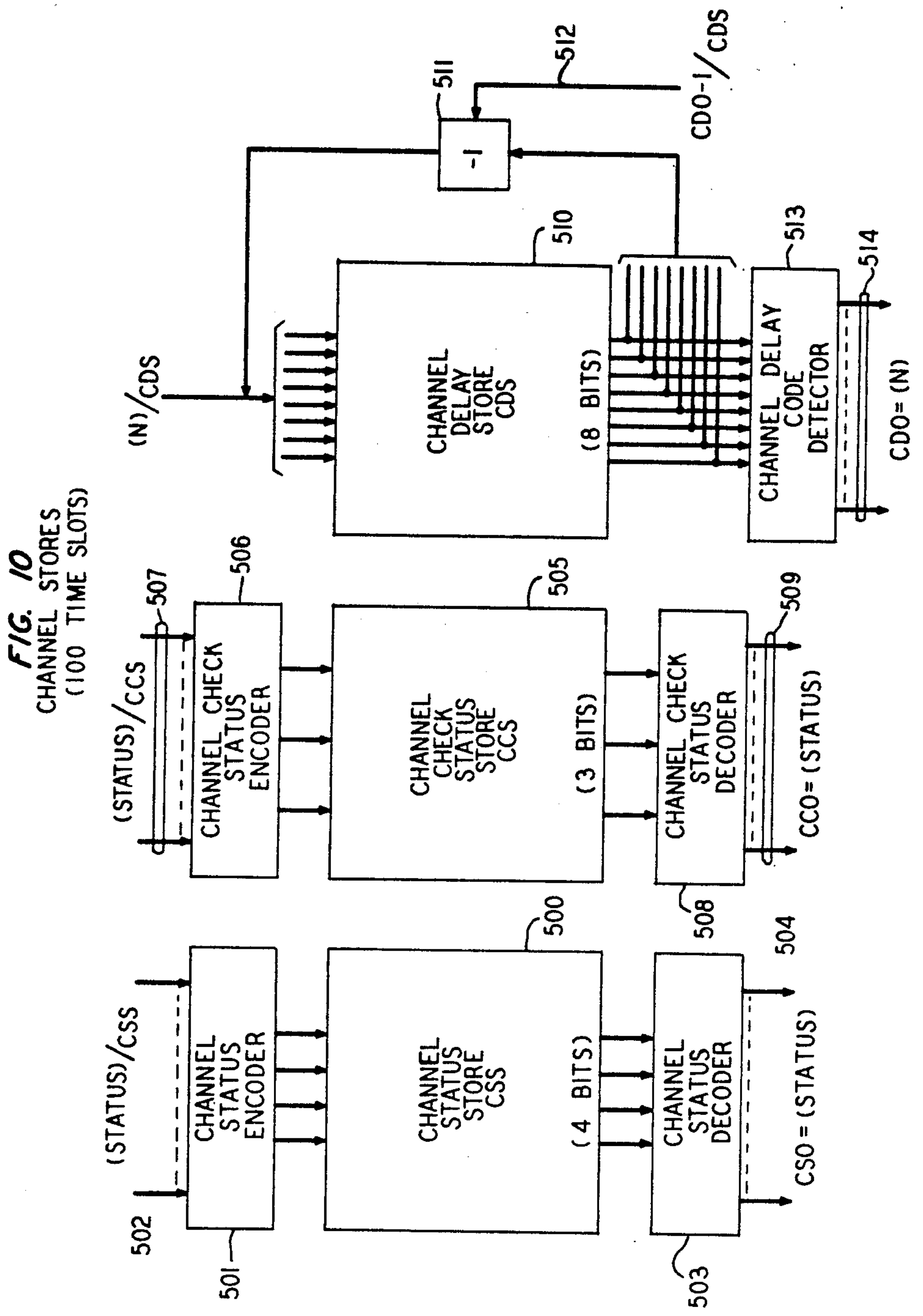
FIG. 10 is a block diagram of the channel stores suitable for use in the interpolation system of FIG. 1.

In FIG. 10 there is shown a block diagram of the channel storage units. Each of these storage units includes 100 stages or timeslots and is used to store information concerning each of the transmission channels of the TASI system of FIG. 1.

A Channel Status Store (CSS) 500, having four bit positions, is utilized to store a coded indication of the current status of each transmission channel. A channel status encoder 501 is utilized to convert status indication commands on 16 input leads 502 into binary codes for storage in CSS store 500. A channel status decoder 503 reconverts these binary codes into status indicating signals on output leads 504. In Table III there is shown the various channel status codes with a brief description of each.

TABLE III

Channel Status Codes (CSS)

| Code | Description |
|---|---|
| CSO = | |
| NOR | Normal |
| MLR | Manual Lockout Request |
| MLI | Manual Lockout in Progress |
| MLO | Manually Locked Out |
| ALR | Automatic Lockout Request |
| ALI | Automatic Lockout in Progress |
| ALO | Automatically Locked Out |
| RCK | Priority Request for Channel Check |
| CLI | Cable Lockout in Progress |
| CLO | Cable Group Locked Out |
| CLR | Cable Lockout Request |
| RLI | Release Lockout in Progress |
| RLR | Release Lockout Request |
| SLI | Satellite Lockout in Progress |
| SLO | Satellite Locked Out |
| SLR | Satellite Lockout Request |

A more detailed description of these status codes and their use in the system in FIG. 1 will be taken up hereinafter.

A Channel Check Store (CCS) 505 having three bit positions is provided to store code indications of the results (as status codes) of the channel check procedure. In general, this procedure serves to test automatically the condition of each transmission channel on a regularly recurrent basis. A channel check status encoder 306 converts status indicating signals on eight input leads 307 into appropriate binary codes. Similarly, a channel check status detector 308 reconverts these binary codes into status indications on eight output leads 309. The channel check status codes are shown in Table IV.

TABLE IV

Channel Check Codes (CCS)

| Code | Description |
|---|---|
| CCO—OS | Out of Service |
| L1 | Level Greater than 3 db Low |
| L2 | Level Greater than 3 db High |
| N1 | Noisy |
| F1 | Failed Once |
| F2 | Failed Twice |
| LN | Channel Out of Limits, Level and Noise |

A Channel Delay Store (CDS) 310 is provided for storing eight-bit codes representing the relative delay time of each transmission channel. These codes, which are used in the manner to be hereinafter described, may be decremented in decrement circuit 311 in response to decrementing commands on lead 312. A channel delay code detector 313 detects particular values of the delay codes and provides an indication thereof on output leads 314.

Figure 11:
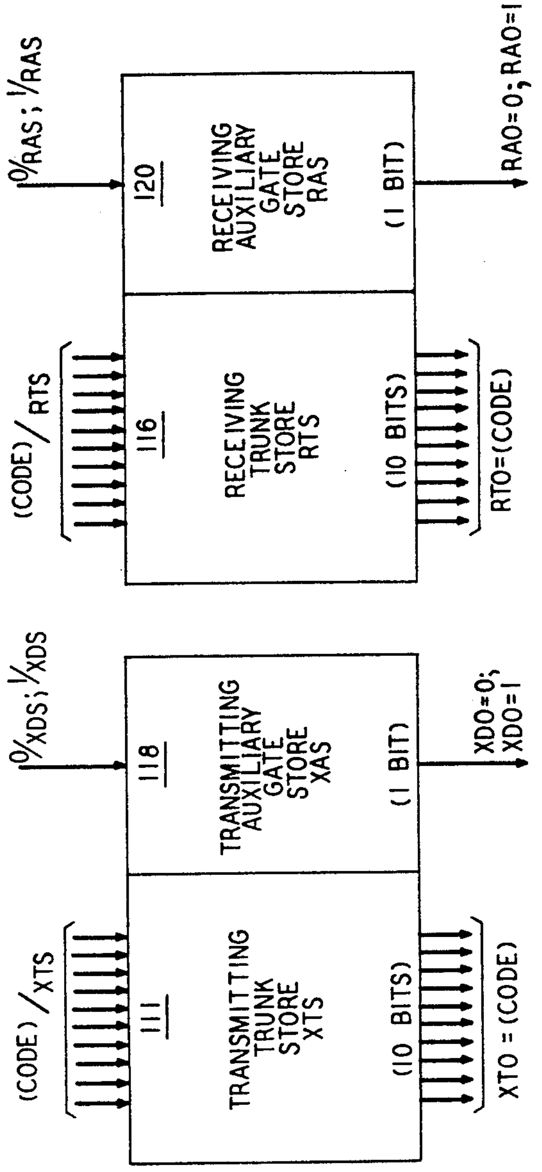
FIG. 11 is a block diagram of the gate stores suitable for use in the interpolation system of FIG. 1.

In FIG. 11 there is shown, for the purposes of completeness, the gate storage units used in the time assignment speech interpolation system of FIG. 1. The transmitting trunk store 111 (which is also shown in FIG. 1) is a 10 bit storage device having 100 stages or timeslots and serving to store 10-bit trunk codes. These trunk codes, when applied to the transmitting switch 106 of FIG. 1, serve to connect the identified trunk to that channel whose channel code is generated in the timeslot to which the trunk code appears. Similarly, transmitting auxiliary gate store (XAS) 118 stores a "1" bit in each timeslot for which the corresponding auxiliary gate is to be operated.

In a similar fashion, the receiving trunk store (RTS) 116 also has 10-bit storage positions and stores the trunk codes necessary to operate receiving switch 107 in FIG. 1. The receiving auxiliary gate store (RAS) 120 stores a one-bit code which is used to operate the receiving auxiliary switch 119 in FIG. 1. The operation of these gates may be more readily perceived in considering FIGS. 12 and 13.

The Time Division Switches

Figure 12:
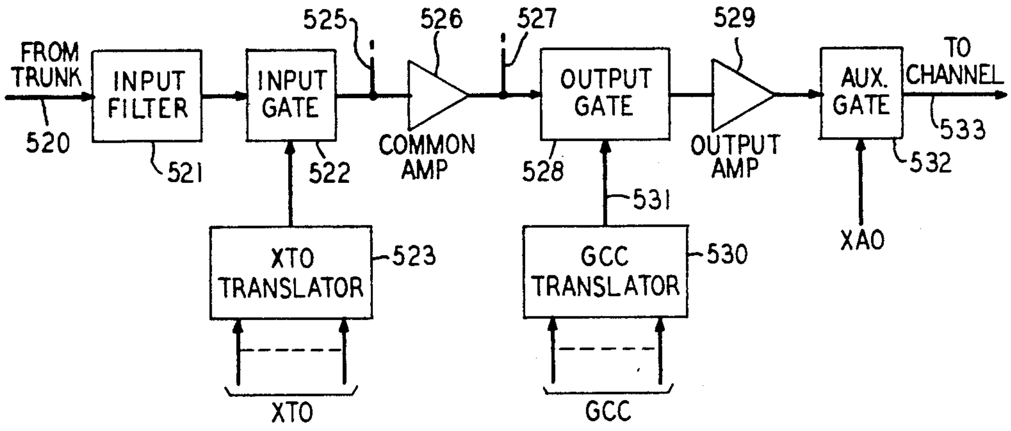
FIG. 12 is a block diagram of the transmitting switch of the interpolation system disclosed in FIG. 1.

In FIG. 12 there is shown a more detailed block diagram of the transmitting switch 106 of FIG. 1. Since the per-trunk and per-channel equipment is identical for each trunk and channel, respectively, only one set of such equipments is illustrated in FIG. 12. Thus, a trunk identified in FIG. 12 by reference numeral 520 is applied to an input filter 521 which serves to limit transmitted signals to the voice band. This signal is applied to an input gate 522 which may comprise any electronic signal gate of sufficient speed and isolation characteristics. Gate 522 is under the control of a translator circuit 523 which translates the binary codes from XTS store 111 (FIG. 11) into a gate enabling signal on lead 524. The output of gate 522 is connected to an input gating bus 525 to which input gates from all of the other trunks are likewise connected.

A common amplifier 526 separates input gating bus 525 from output gating bus 527 in the manner taught in S. C. Kitsopoulos U.S. Pat. No. 3,444,326, granted May 13, 1969. Amplifier 526 serves to rapidly discharge stray capacitances and thus minimizes cross-talk between the successive PAM samples on buses 525 and 527.

An output gate 528, similar to gate 522, connects output bus 527 to an output amplifier 529. Output gates similar to gate 528, one for each of the transmission channels, are also connected to output bus 527. Gate 528 is under the control of a translator circuit 530 which translates the generated channel codes (GCC's) from the circuit of FIG. 2 into a gate enabling signal on lead 531.

The output of amplifier 529 is supplied to auxiliary gate 532 which is under the control of output signals from XAS store 118 in FIG. 11. The output of gate 532 is connected to channel 533.

It can be seen that the transmitting switch in FIG. 12 is a pulse amplitude modulated (PAM), time-division switch which serves to connect pulse samples from trunk 520 to channel 533 by simultaneously operating an input gate 522, an output gate 528, and an auxiliary gate 532 in the same timeslot. Similar connections between other trunks and other channels are accomplished by operating similar sets of gates in different timeslots.

Figure 13:
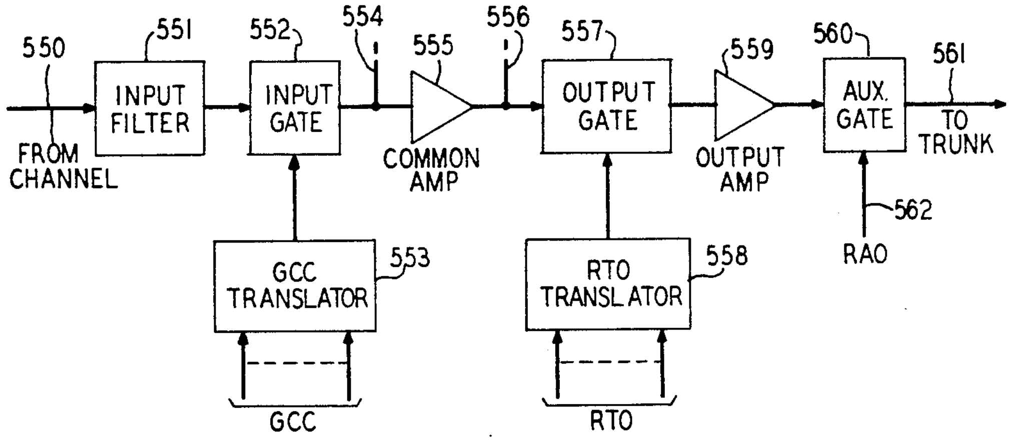
FIG. 13 is a block diagram of the receiving switch of the interpolation system of FIG. 1.

In FIG. 13 there is shown a receiving switch similar to the transmitting switch i5 FIG. 12 but utilized to connect transmission channels to subscriber trunks at the TASI receiver. Thus, transmission channel 550 is connected by way of an input filter 551 to input gate 552. Input gate 552, under the control of GCC translator 553, connects the output of input filter 551 to input bus 554. Common amplifier 555 connects input bus 554 to output bus 556 and minimizes cross-talk between successive pulse samples.

Output gate 557, under the control of RTO translator 558, connects output bus 556 to output amplifier 559. The output of amplifier 559 is connected by way of auxiliary gate 560 to trunk circuit 561. Gate 560 is under the control of signals on lead 562 from receiving auxiliary gate store (RAS) 120 of FIG. 11.

It is readily apparent that the receiving switch of FIG. 13 operates in a manner identical to the transmitting switch of FIG. 12 and performs the converse function of interconnecting transmission channels to receiving trunks on a time-division basis.

Detailed Description of Connection Process

FIGS. 14 through 19 are sequence or flow charts which illustrate in detail the procedure for establishing a new connection in the Time Assignment Speech Interpolation (TASI) system of FIG. 1. Furthermore, the flow charts of FIGS. 14 through 19 also provide a detailed specification of the logic circuits necessary to implement this procedure. Before proceeding to a detailed description of these flow charts, a brief description of the conventions used is in order.

The basic organization of the flow charts of FIGS. 14 through 19 is to provide a description of the sequence of logical decisions which are necessary to implement the overall new connection procedure in the TASI system of FIG. 1. The sequence of these logical decisions and operations proceeds from the top to the bottom of the flow charts. Each line of the flow chart represents a specific subfunction which is identified with an appropriate text label in the left-hand box of that line. Major timing intervals are disclosed in the next box and correspond to the timing intervals defined in FIGS. 3 and 4 of the drawings. When these timing intervals extend over more than one subfunction box, an arrow is used to indicate the span of subfunctions which take place in the identified timing interval.

The remaining small boxes on each line each represent a single logical decision. The logical conditions which must be met for each logical decision appear as equations or as timing pulse identifications near the top of the box. Logical conditions common to more than one basic logical decision are shown as extending across the top of more than one decision box and separated therefrom by a dashed line.

The action to be taken as a result of all of the logical conditions in a box being met is represented in abbreviated form at the bottom of that decision box. These actions or commands each include a slash ("/") which may generally be read as "into". The meaning thereby intended is that the coded information item identified on the left-hand side of the slash is to be placed into the piece of apparatus identified on the right-hand side of the slash. The symbols "R" and "S" on the left of the slash represent "reset" and "set", respectively, and are applied to flip-flops and registers as shown in FIGS. 5 and 7 of the drawings.

A comma is sometimes used to separate items to which a common command is applied. For example, "R/R5,R6 means to reset registers R5 and R6. Arrows are generally used to show the direction of time flow.

Returning then to FIG. 14, the flow chart 600 describes the connect queue update function and logical circuitry. The first line 601 of flow chart 600 describes the subfunction of checking the occupancy of the connect queue (CHECK CQ OCCUPANCY). As indicated in box 602, this subfunction takes place during time period XT5, illustrated in FIG. 4. XT5 is the last trunk scan period of each 2.4-millisecond signaling interval.

The decision boxes 603 and 604 are subtended by the timing pulse label T000, illustrated in FIG. 3 and representing the first one-microsecond timeslot in each trunk scan interval. This timeslot is not assigned to an actual trunk and therefore can be used in the present way to reset registers and flip-flops to be used during the trunk scanning period.

During clock phase CL03 of the T000 timeslot, as shown in box 603, the Occupied Queue number one (OQ1) flip-flop is reset by the command "R/OQ1". Similarly, during the same clock phase and timeslot, the Occupied Queue number two (OQ2) flip-flop is reset by the command "R/OQ2" in decision box 604.

Figure 14:
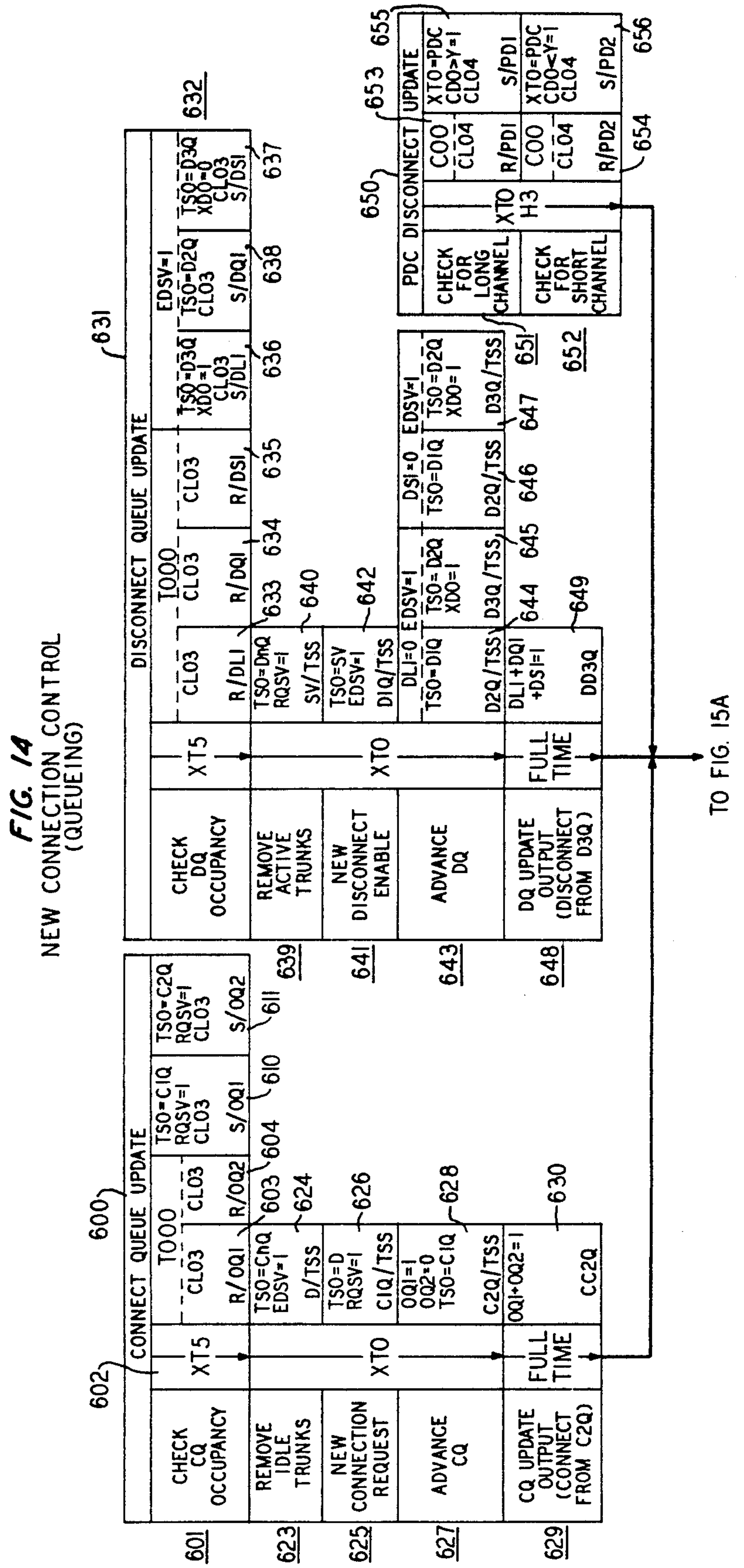
FIG. 14 is a flow or sequence chart of the new connection control (queueing) process used by the interpolation system of FIG. 1.

For the purposes of illustration, the logic necessary to implement the decision processes of line 601 in FIG. 14 are each explicitly shown in FIG. 20. Thus, in FIG. 20, AND gate 605 has as its inputs an XT5 pulse on lead 606, a T000 pulse on lead 607, and a CL03 clock pulse on lead 608. The output of AND gate 605 on lead 609 therefore corresponds to the results of the decision boxes 603 and 604 in FIG. 14. Output lead 609 therefore is used to reset the OQ1 and OQ2 flip-flops and is thus labeled "R/OQ1", "R/OQ2". These flip-flops are, of course, similar to that shown in FIG. 7.

Returning to FIG. 14, the next box on line 601 is decision box 610 which requires that, during the XT5 trunk scanning pulse, the output of the trunk status decoder 454 (FIG. 8) be examined for C1Q status indications. As noted in Table I, the C1Q status indicates that the associated trunk is in the first connect queue.

Decision box 610 further requires that "RQSV=1". This is an indication that the trunk identified in that timeslot is currently requesting service. As shown in FIG. 1, the RQSV signal is provided by speech detectors 121 in response to valid speech signals on one of the input trunks 108.

If the trunk status store 451 indicates that any trunk is currently in the first connect queue and is simultaneously requesting service, then during the CL03 clock phase of that trunk timeslot, the OQ1 flip-flop is set, as indicated by the command "S/OQ1". Similarly, decision box 611 makes a similar decision, but this time restricted to trunks having a status indication of their being in the second connect queue. The command at the bottom of box 611 is thus to set the OQ2 flip-flop (S/OQ2). Again, FIG. 20 illustrates in detail the logic necessary to make these determinations and perform the appropriate functions. Thus, in FIG. 20, AND gate 612 has applied thereto an XT5 pulse on lead 613, a CL03 clock pulse on lead 614, and an RQSV pulse on lead 615. When all of these pulses are simultaneously present, AND gate 612 is fully enabled and provides an output to partially enable AND gates 615 and 617.

If the trunk status output indicates membership in the first connect queue by a signal on lead 619 (TSO=C1Q), then AND gate 616 is fully enabled to provide an output signal on lead 618 to set the OQ1 flip-flop (S/OQ1). If the trunk status output indicates membership in the second connect queue by a signal on lead 620 (TSO=C2Q), then AND gate 617 is fully enabled to provide an output on lead 621 to set the OQ2 flip-flop (S/OQ2).

The detailed logic of FIG. 20 is provided for illustrative purposes only. The logic necessary to implement all of the other decision boxes of FIGS. 14 through 19 will be readily apparent from the logical equations therein and the illustrative logic of FIG. 20.

Returning then to FIG. 14, it is clear that line 601 serves the general purpose of scanning both of the connect queues to ascertain if there are any trunks which are requesting but have not yet received service. Such trunks, of course, will be the candidates for new connections. In general, the process of setting up new connections detailed in FIGS. 14 through 19, involves the following steps, all of which will be described in connection with FIG. 1.

1. Select a trunk candidate from trunks 108 which is requesting but not receiving service, as indicated by speech detectors 121.

2. Select a channel disconnect candidate from the channel facilities 102 and 104 which channel is no longer being used to transmit speech.

3. Assign the trunk candidate to the channel candidate and signal this new trunk-channel assignment to the remote receiving terminal 101 by way of signaling receiver 112 and signaling receiver 115′.

4. Turn off the transmitting channel auxiliary gate 117 by writing an appropriate control signal into XAS store 118.

5. Wait until the new assignment has been processed at the receiving terminal 101 including turning off the receiving trunk auxiliary gate 119′ for a period of 4 milliseconds.

6. At substantially the same time, load the assigned trunk address into XTS store 111 of transmitting terminal 100 and into RTS store 116′ in receiving terminal 101. These trunk addresses are loaded into the timeslot permanently dedicated to the assigned channel and thus serve to connect the identified trunk to the assigned channel through the time division switches 106 and 107′.

7. Release the transmitting auxiliary gate 117 and the receiving auxiliary gate 119′, thus completing the connection from the calling trunk to the called trunk.

In FIG. 14 the connect queue update function 600 includes at line 623 the subfunction "REMOVE IDLE TRUNKS". During the XTO trunk scanning cycle the connect queues C1Q and C2Q are examined. If any trunk in these queues no longer requires service (EDSV=1), that trunk is removed from the queue by changing the queue occupancy status to the disconnect status D. In box 624 the term "C$n$Q" indicates any one of the connect queues and could alternatively be written as "C1Q+C2Q". Again, the logic for accomplishing this function is obvious from the logical conditions of box 624 and the illustrative logic of FIG. 20.

At line 625, the subfunction NEW CONNECT REQUEST is performed, also taking place during the XTO trunk scanning cycle. That is, if the current status of the trunk indicates that the trunk is disconnected (D) and if the trunk is currently requesting service (RQSV=1), then that trunk is entered into the first connect queue by writing the status C1Q into TSS store 451 (FIG. 8).

At line 627 the trunks are advanced from the first to the second connect queue in response to the logical conditions stated in box 628. That is, if C2Q is empty (OQ2=0) and C1Q is occupied (OQ1=1), then, for each trunk in the first connect queue (TSO=C1Q), the status is changed to the second connect queue (C2Q/TSS). In this way all the occupants of the first connect queue are transferred to the second connect queue. This group queueing technique is illustrated in more detail in U.S. Pat. No. 3,573,745, granted on Apr. 6, 1971 to C. J. May, Jr.

At line 629 a signal called the "CQ UPDATE OUTPUT" is generated in response to a "1" output of either of flip-flops OQ1 or OQ2. This output, identified in decision box 630 as "CC2Q" is available through the remainder of the new connect control process to indicate that a new connection is necessary during the current new connection cycle.

Also shown in FIG. 14 is the disconnect queue update function 631, which includes at line 632 the CHECK OCCUPANCY subfunction which takes place during the XT5 trunk scanning period. During the CL03 clock phase of the T00 trunk timeslot, the flip-flops identified as the long disconnect candidate available DL1 flip-flop, the disconnect queue occupied DQ1 flip-flop, and the short disconnect candidate available DS1 flip-flop are all reset, as indicated by boxes 633, 634 and 635. Also during the XT5 trunk scanning period, for each trunk which no longer requires a connection (EDSV=1), the appropriate ones of these three flip-flops are set. In box 636 the DL1 flip-flop is set (during the CL03 clock phase) if a trunk is found in the third disconnect queue (TSO=D3Q) and if that trunk is currently connected to a long satellite channel (XDO=1). Similarly, in decision box 637 (during the CLO3 clock phase) the DS1 flip-flop is set if a trunk is found in the third disconnect queue (TSO=D3Q) and if the trunk is currently assigned to a short cable channel (XDO=0). Finally, the DQ1 flip-flop is set in box 638 (during the CLO3 clock phase) if a trunk is in the second disconnect queue (TSO=D2Q).

It can be seen that line 632 serves to generate an indication that disconnect candidates are available in the third disconnect queue and to identify these candidates as short or long candidates. Flip-flop DQ1 is used to indicate that another candidate is waiting if there are none currently in the third disconnect queue.

At lines 639 the subfunction REMOVE ACTIVE TRUNKS is performed in box 640 by substituting the service status (SV/TSS) for all trunks in any of the disconnect queues (TSO=D$n$Q) but which trunks are currently requesting service (RQSV=1).

At line 641 any new disconnect candidates are noted in box 642 by changing their status to indicate membership in the first disconnect queue (D1Q/TSS). This takes place if the current status indicates they are receiving service (TSO=SV) and speech detectors indicate that service is not currently required (EDSV=1).

At line 643 the disconnect queues are advanced, boxes 644 and 645 being used to advance candidates if there were no long candidates in the third disconnect queue (DL1=0) and boxes 646 and 647 being used to advance candidates if no short disconnect candidates were found in the third disconnect queue (DS1=0). In each case candidates are advanced from the first disconnect queue (TSO=D1Q) to the second disconnect queue (D2Q/TSS) but are advanced from the second disconnect queue (TSO=D2Q) to the third disconnect queue (D3Q/TSS) only if the associated trunk is currently connected to a long channel (X-DO=1).

At line 648 the disconnect queue update function is summarized in box 649 by a signal identified as DD3Q which is produced if any one of flip-flops DL1, DQ1 or DS1 is set, indicating that a disconnect candidate is available.

Functions 600 and 631 in FIG. 14 take place simultaneously and, when completed, provide indications (CC2Q and DD3Q) that connect and disconnect candidates are available or the current connection cycle. Before proceeding to the next step of the connection cycle, a search is made for priority disconnect candidates at function 650. That is, at line 651 a check is made during the H3 channel scanning subperiod of the XTO trunk scanning period for a long priority disconnect channel.

Before proceeding with a description of the priority disconnect candidate (PDC) disconnect search, it will be helpful to describe the priority disconnect function itself. It should be recalled that assignments of trunks to channels are altered merely by writing new trunk assignments over the previous trunk assignments in the transmitting and receiving trunk stores 111 and 116' (FIG. 1), respectively. If it is desired to withdraw a channel from service in order, for example, to perform routine maintenance or in response to a channel failure, this can most expeditiously be accomplished by assigning a fictitious trunk code to that channel. Therefore, when it is desired to restore a channel to service, a PDC code, corresponding to the unused trunk 345, is inserted in the appropriate channel timeslot of the transmitting trunk (XTS) store 111. This PDC code indicates a previously unused channel that is now available for interpolation service. This channel may be taken without disconnecting a real-trunk channel assignment and therefore is selected on a priority basis.

Returning to FIG. 14, the PDC disconnect update function 650 includes at line 651 a check for a long PDC channel having a PDC code assigned thereto and at line 652 a check for a short channel having a PDC assigned thereto. In box 653, during the H3 channel scanning period of the XTO trunk scanning period, and during the CLO4 clock phase of the C00 channel timeslot, a first priority disconnect (PD1) flip-flop is reset. As indicated in box 654, at the same time a second priority disconnect flip-flop (PD2) is also reset. The C00 channel timeslot is not assigned to a working channel and thus can be used for such operations as resetting registers and flip-flops in preparation for receiving the results of a channel scanning operation. Two flip-flops, PD1 and PD2, are provided to store an indication of long and short channels, respectively, occupied by a PDC code.

In box 655 the long PDC channel is detected by examining the output of transmitting trunk (XTS) store 111 (FIG. 11) for the PDC code (XTO=PDC). At the same time, the output of the channel delay (CDS) store 510 (FIG. 10) is examined to ascertain whether the delay of that channel is greater than some preselected value of Y. Y, of course, is chosen so as to discriminate between long and short channels and may be on the order of 75 to 80 milliseconds. This delay determination (CLO > Y=1) can most expeditiously be accomplished merely by examining the most significant bits of the output of CDS store 510. If the PDC channel is a long channel, the PD1 flip-flop is set during the CLO4 clock phase of the appropriate channel timeslot as indicated by decision box 655. Similarly, the PD2 flip-flop is set during the CL04 clock phase for short PDC channels as indicated in decision box 656. Flip-flops PD1 and PD2 are utilized later on in the connection process to insure the release of the corresponding channels.

Figure 15A:
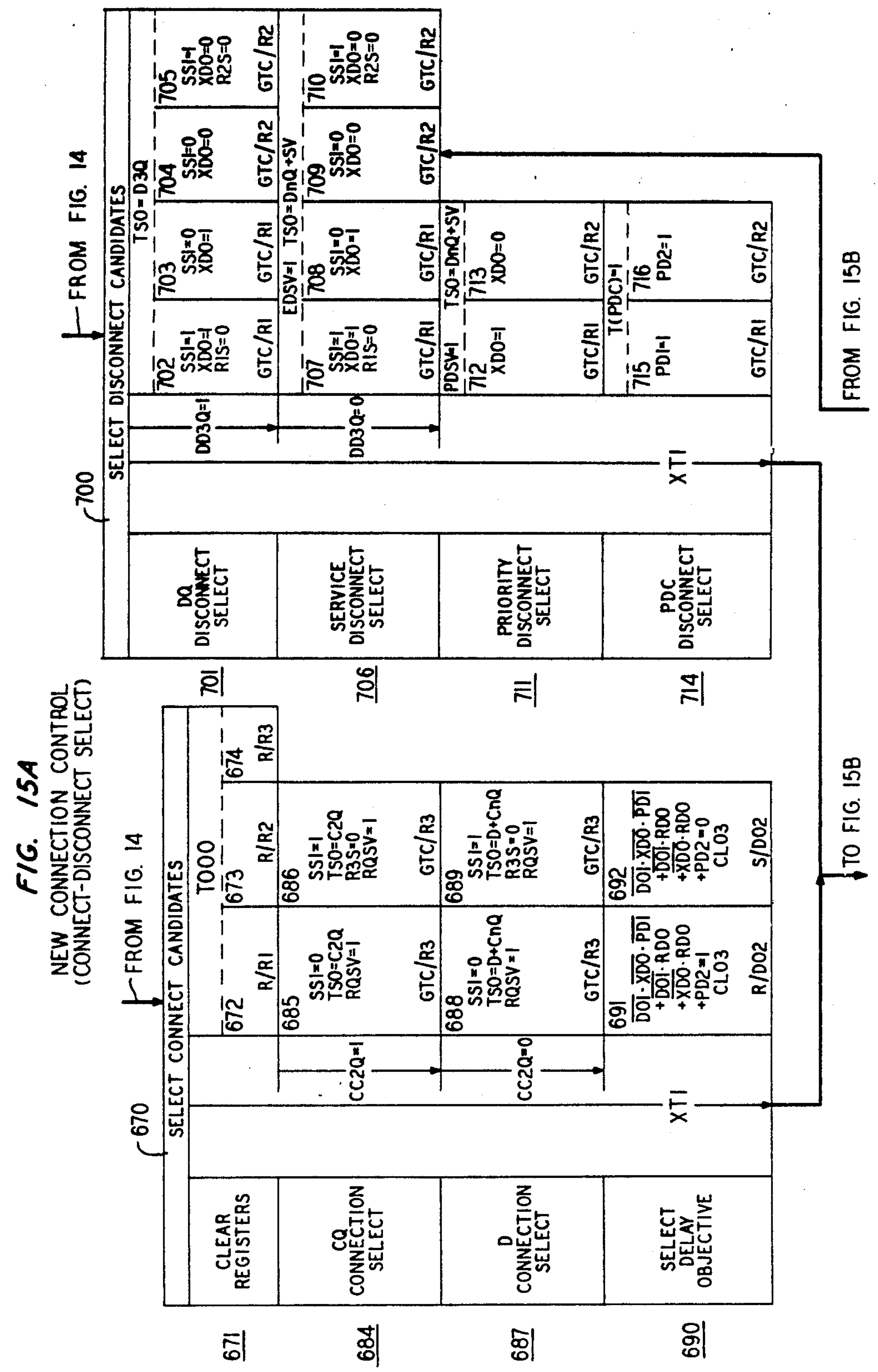
FIGS. 15A and 15B together are a flow or sequence chart of the new connection control (trunk-channel select) process used by the interpolation system of FIG. 1.

Continuing the new connection process, in FIG. 15A there is disclosed the procedure for selecting connect and disconnect candidates. In the select connect candidate function 670, the first subfunction required at line 671 is to clear three storage registers, each similar to the one illustrated in FIG. 5. These three registers are used for storing one connect candidate and two disconnect candidates, one assigned to a long channel and the other assigned to a short channel. These storage registers have been identified at line 671 as registers R1, R2 and R3. Thus, during the TOOO trunk timeslot of the XT1 trunk scanning period, the three registers R1, R2 and R3 are reset, as indicated in boxes 672, 673 and 674, respectively.

Since all trunk and channel scans take place in numerical sequence in response to the generated trunk and channel codes, it is clear that all selections made on the basis of such scans would highly favor the lower numbered trunks. It is desirable, however, to treat all trunks more equitably, particularly during a heavy load when they may be awaiting a necessary connection. Similarly, since each disconnected trunk must regain a new connection before continuing its transmission, some small degradation is associated with the disconnected trunk. Disconnect selection should therefore also be made as equitably as possible. Such equitable treatment of connect and disconnect selection is accomplished by introducing a random factor into the scanning operation. This is accomplished by the select scan randomization function 675, shown in FIG. 15B.

In general, scan randomization is provided by setting a start scan (SS1) flip-flop with a "random" pulse which occurs in one of the trunk timeslots. To obtain a quasi-random selection, the connect candidate is the highest numbered trunk requesting service before the SS1 flip-flop is set or, if none existed, the lowest numbered trunk requesting service after flip-flop SS1 is set. Disconnect candidates are picked in the same way.

The random pulse to set the SS1 flip-flop is a pulse occurring in the timeslot corresponding to a start scan code (SSC). This SSC code is stored in the T345 timeslot of the limited access store LAS 450 in FIG. 8. For simplicity, this random code is the trunk code of the last trunk to get a new connection.

Figure 15B:
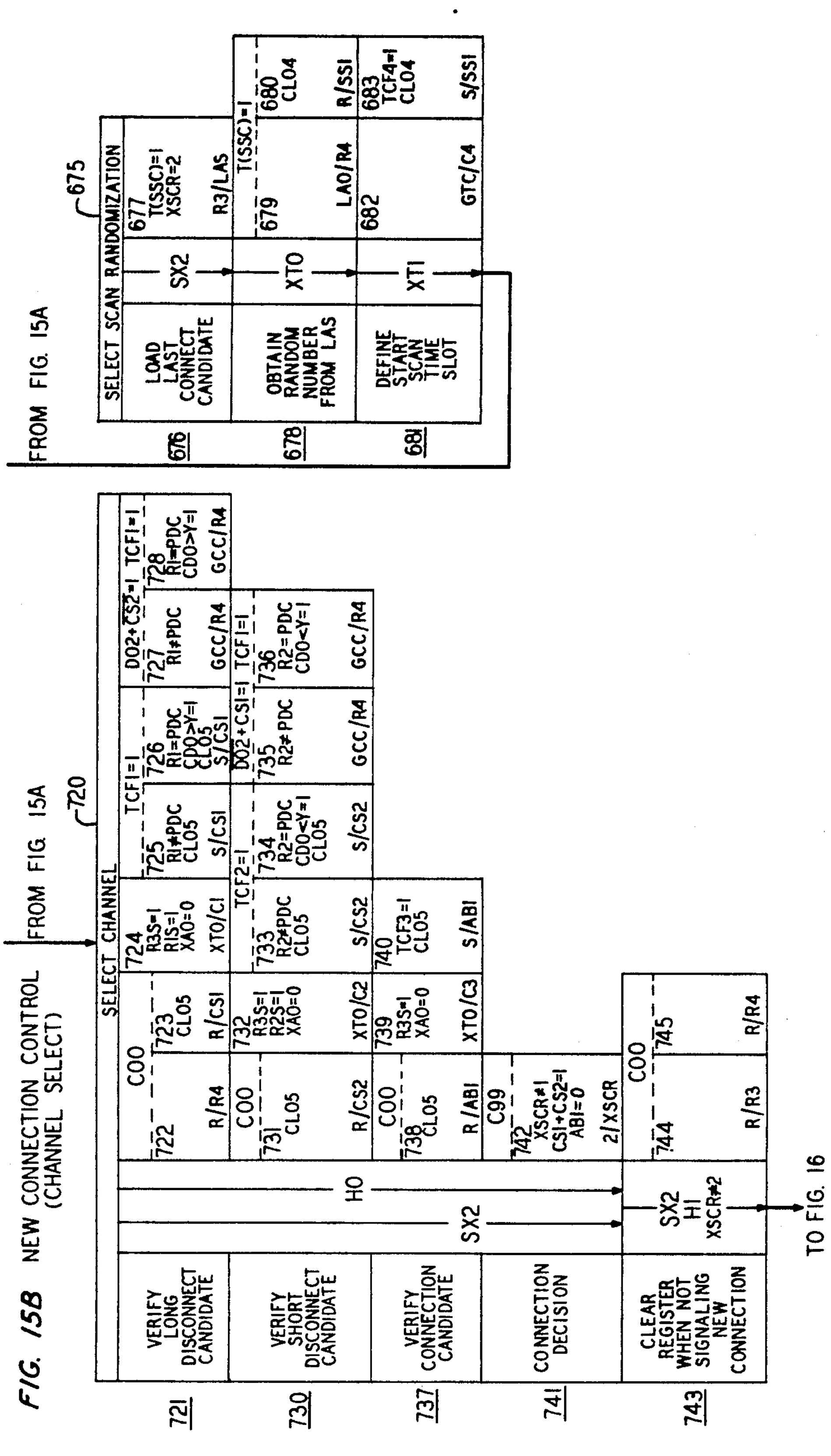

At line 676 of select scan randomization function 675 in FIG. 15B, this last connect candidate is loaded into the LAS store 450. In particular, this takes place during the XT2 trunk scanning period of the previous signaling cycle, provided that signaling actually takes place. The symbol SX2 indicates an XT2 timing period during which signaling is actually enabled. In decision box 677 of line 676, the SSC timeslot is ascertained (T(SSC)=1) by a code detector. A signal (XSCR=2), which will be described in detail hereinafter, indicates that a new connection is being signaled. The action taken by decision box 677 is to place the contents of storage register R3 (which is the new connection candidate) into the limited access LAS store 450. Thus, a function of each new connection signaling cycle is to save the trunk code of the newly connected trunk in the SSC timeslot for use in the scan randomization function for the next new connection.

At line 678, during the XTO trunk scanning period of the next signaling cycle, the SSC code is retrieved from the limited access store 450 in box 679. That is, during the T(SSC) timeslot, the contents of the LAS store (LAO) are placed in the R4 storage register (LAO/R4). In box 680, during the CLO4 clock phase of that timeslot, the SS1 flip-flop is reset cR/SS1). At line 681, during the XT1 trunk scanning period, the generated trunk codes (GTC) are compared to the contents of the R4 storage register by applying these generated trunk codes to a compare circuit corresponding to compare circuit 307 in FIG. 5. This comparison takes place in box 682 (GTC/C4). When this comparison produces an indication that the trunk codes match (TCF4=1), the generated trunk code is equal to the SSC code previously stored in the R4 storage register. As shown in box 683, during the CLO4 clock phase of that trunk timeslot, the SS1 flip-flop is set (S/SS1).

Returning to FIG. 15A, at line 684 of function 670 the CQ CONNECTION SELECTION takes place. Line 684 is enabled during the XT1 trunk scanning period, provided that a (CC2Q=1) signal is available. The signal, of course, has been generated by box 620 in FIG. 14 and indicates that a connect candidate is present in the queue. At this time, as indicated in decision box 685, and provided the SS1 flip-flop is reset (SS1=0), provided further that a connect candidate is in the second connect queue (TSO=C2Q), and further provided that this trunk is still requesting service (RQSV=1), then the trunk code being generated in that timeslot is written into storage register R3 (GTC/R3) as the new connect candidate.

It will be noted that new candidates will overwrite the old candidates up until the SS1 flip-flop is set and thus, the highest numbered trunk will remain in storage register R3 when the SS1 flip-flop is set. As shown in decision box 686, after the SS1 flip-flop is set (SS1=1), a new connect candidate is written into the R3 storage register (GTC/R3) only if no candidate has yet been entered into the R3 storage register (R3S=0). This latter condition is obtained from a status detector corresponding to detector 304 in FIG. 5. The total effect of boxes 685 and 686 is to implement the randomization strategy described above.

This same strategy is utilized at line 687 to select a trunk as a connect candidate in case there is no potential candidate in the connect queues (CC2Q=0). Boxes 688 and 689 correspond to boxes 685 and 686, respectively.

At line 690 a delay objective (long or short) is selected depending on the trunk selected at lines 684 or 687. The specific delay selection strategies are summarized by the logic equations in boxes 691 and 692 and are described in detail in a copending application, Ser. No. 844,379, filed July 24, 1969, and assigned to applicants' assignee. In summary, a delay objective DO2 flip-flop is reset (R/DO2) in box 691 if the new trunk selected prefers a short channel and is set (S/DO2) at decision box 692 if the newly selected trunk prefers a long channel.

Function 700 of FIG. 15A is the select disconnect candidate function by means of which trunks already connected to transmission channels but no longer requesting service are selected as possible disconnect candidates. In line 701 of function 700, a disconnect selection is made from the disconnect queue (DQ). This occurs during the XT1 trunk scanning interval provided a DD3Q signal is available from decision box 649 (FIG. 14). The disconnect selection is actually made in decision boxes 702, 703, 704 and 705, all of which are conditioned by (TSO=D3Q), indicating the trunks which are in the third disconnect queue. The select process taking place at line 701 for disconnect candidates is substantially identical to the select process taking place at line 684 for connect candidates. Boxes 702 and 705 correspond to box 686 for long (XDO=1) and short (XDO=0) channels, respectively. The long channel disconnect candidate is placed in storage register R1 (GTC/R1) while the short disconnect candidate is placed in storage register R2 (GTC/R2).

Decision boxes 703 and 704 correspond to decision box 685 for the long (XDO=1) and short (XDO=0) candidates, respectively. As discussed in connection with line 684, the SS1 flip-flop serves to randomize the disconnect candidate selection in a manner described with respect to connect candidate selection.

If no disconnect candidates were available in the disconnect queue (DD3Q=0), then any idle trunk (EVSV=1) with a connection (TSO=DnQ+SV) can be selected as a disconnect candidate. Start scan randomization is utilized in decision boxes 707, 708, 709 and 710 in a manner identical to that in boxes 702, 703, 704 and 705, respectively.

As has been discussed for channels, certain trunks can likewise be locked out of service for maintenance or repair, and some trunk codes correspond to fictitious trunks. Finally, trunks may be on-hook and incapable of requesting service. If any of these three conditions exist for a trunk which has service, such a trunk should be selected on a priority basis for a disconnection. This is accomplished at line 711 in boxes 712 and 713. A priority disconnect if being serviced (PDSV=1) signal is provided for each trunk which is either on-hook, locked out or fictitious. Should any of these trunks have been assigned a service status or been placed in a disconnect queue (TSO=DnQ+SV), then these trunks are selected for disconnection. Long disconnect candidates (XDO=1) are selected at decision box 712 and loaded in storage register R1 (GTC/R1) and short candidates (XDO=0) are loaded in storage register R2 (GTC/R2) in decision box 713.

At line 714 the PDC priority disconnect selection takes place. It will be recalled that, in connection with the description of function 650 in FIG. 14, the PDC code was used to identify a channel requesting a rapid reuse after disconnection for channel maintenance or other non-interpolation uses. After all active trunks have been scanned, during the timeslot T345 (T(PDC)=1), any existing PDC code is written into storage register R1 (GTC/R1) in decision box 715, provided it is connected to a long channel (PD1=1) or is written into storage register R2 (GTC/R2) in decision box 716, provided it is connected to a short channel (PD2=1). If no PDC code exists, the previously selected candidates remain in R1 and R2.

At the conclusion of the XT1 trunk scanning interval, a connection candidate code is stored in storage register R3, a long disconnect candidate is stored in storage register R2, and a short disconnect candidate is stored in register R1. These candidates are actually chosen for connection and disconnection, respectively, only if certain other conditions are met. Obviously, either the long or the short disconnect candidate must be selected, and not both. The actual selection is shown in FIG. 15B as function 720 called SELECT CHANNEL.

In the 100-microsecond channel scanning period immediately following candidate selection, that is, during the HO channel scanning period of the XT2 trunk scanning period, the processing is continued to select a channel candidate. There is no need, however, to continue such selection if the signaling channel is not yet available for signaling the new connection. The signaling request condition (REQD, FIG. 1) is therefore combined with the XT2 timing pulse to form an SX2 signaling enabled pulse. This SX2 enabling signal controls the entire select channel function 720 in FIG. 15B. All subsequent timing intervals which are dependent on the availability of a signaling channel are designated by the SXn designation.

At line 721 of function 720, the long disconnect candidate previously selected in connection with FIG. 15A is verified. This is accomplished with the use of a connect signaling (CS1) flip-flop which is used to store an indication that a valid long connect candidate has been selected. Thus, in box 722, during the COO channel timeslot, the R4 storage register is reset and, in box 723, during the CLO5 clock phase, the CS1 flip-flop is reset. In decision box 724, if a connect candidate exists (R3S=1) and if a long disconnect candidate exists (R1S=1), then the contents of the XTS transmitting trunk store 111 (FIG. 1) are compared to the contents of storage register R1, containing the long disconnect candidate (XTO/C1). If the disconnect candidate is not in the transmitting trunk store 111, an error has occurred. The comparison takes place only for those channels with actual complete connections, as indicated by auxiliary gate operation (XAO=0).

If the comparison in box 724 produces a signal indicating that the code has been found (TCF1=1), then the CS1 flip-flop is set in either box 725 or 726. Special care must be taken with priority disconnect (PDC) candidates, since more than one PDC entry may exist in the XTS store 111. In box 725 the CS1 flip-flop is set (S/CS1) during the CL05 clock phase if the long disconnect candidate is not a PDC code (R1 PDC). In box 726, if the disconnect candidate is a PDC code (R1=PDC), then an additional requirement is made that the channel actually is a long delay channel (CDO > Y=1). The CS1 flip-flop is set (S/CS1) as before during the CL05 clock phase.

Having found a valid disconnect candidate does not guarantee that this candidate's channel will actually be used for the new connection. The long delay objective specified by the DO2 flip-flop (FIG. 15A, line 690) or the lack of a valid short connect candidate will be used (DO2+CS2=1) to determine whether that long candidate is utilized. The long disconnect candidate timeslot pulse (TCF1=1), generated in response to the comparison in box 724, is utilized to write the channel code of the long candidate into the R4 storage register (GCC/R4), but only if, as noted above, a long channel is desired and if no valid short candidate has been found (DO2+CS2=1). The additional consideration for PDC candidates is still required, as indicated in boxes 727 and 728. If the candidate is not a PDC channel (R1 PDC), then the long disconnect candidate's channel can be written directly into the R4 storage register (GCC/R4). If, however, it is a PDC candidate (R1=PDC), then it must also be determined that the PDC channel is indeed a long channel (CDO > Y=1) as shown in box 728.

In line 730 of FIG. 15B, the short disconnect candidate is similarly verified. In this case, in box 731, the CS2 flip-flop is reset during the CLO5 clock phase of the COO channel timeslot. The CS2 flip-flop is utilized to indicate that a valid short candidate exists. If a connect candidate exists (R3S=1) and if a short disconnect candidate exists (R2S=1), then the contents of the XTS transmitting trunk store are compared to the contents of the R2 storage register (XTO/C2) containing the short disconnect candidate. The compare signal (TCF2=1) is produced only for channels having completed connections, as indicated by the respective auxiliary gates being closed (XAO=0). These indications are generated in decision box 732.

In decision boxes 733 and 734, the CS2 flip-flop is set (S/CS2) in a manner identical to that described in connection with boxes 725 and 726. The channel assigned to the short disconnect candidate is written into the R4 storage register in decision boxes 735 and 736 in a manner identical to that described in boxes 727 and 728. The short candidate is utilized, however, only if a short channel is desired and a valid short candidate has been found (DO2+CS1=1).

Following the verifications in lines 721 and 730, there resides in the R4 storage register the code identification of the channel, either long or short, which is connected to the trunk to be disconnected. It is also necessary, however, to verify the connection candidate. This is accomplished in line 737. It will be noted that if the connect candidate already has a connection, this candidate is invalid and the connection process should be aborted. An abort flip-flop AB1 is therefore reset during the COO channel timeslot in box 738. In box 739, if a connect candidate exists (R3S=1), the contents of the XTS transmitting trunk store 111 are compared to the connect candidate in storage register R3 (XTO/C3). The comparison is made only for those trunks actually having a connection, as indicated by the closed auxiliary gate (XAO=0). A compare here (TCF3=1) indicates an invalid connect candidate has been selected and the abort flip-flop AB1 is therefore set (S/AB1) during the CLO5 clock phase in box 740. The AB1 signal may be used to produce an alarm for attendant personnel or for automatically aborting the connection.

At line 741 the connection decision takes place during the last timeslot (C99) of the HO channel select interval. This is accomplished by writing a "2" into the XSCR control register. This register is utilized to control the transmitting connect signaling. It is a 7-state register having the status conditions identified in Table V.

TABLE V

Transmitting Signaling Control Register (XSCR)

| Code | Description |
|---|---|
| XSCR=1 | Priority I Control Signal |
| 2 | (New) Connect Signal |
| 3 | Priority III Control Signal |
| 4 | Channel Control Signal |
| 5 | Print Data Signal |
| 6 | (Repeat) Connect Signal |
| 7 | Remote Update Signal (RSU) |

It will be noted that the "2" state of the XSCR register indicates that connect signaling is to take place. In box 742 this state "2" is written into the XSCR register (2/XSCR) only if this register is not already in the Priority I state (XSCR 1), indicating that a switchout procedure is in progress. Moreover, the connect signal status "2" is written into the XSCR register only if both a valid connect (AB1=0) and disconnect (CS1+CS2=) candidate are available. At line 743, during the next channel scanning period H1, storage registers R3 and R4 are reset (R/R3,R/R4) if signaling is not going to take place (XSCR 2). These registers are reset in boxes 744 and 745, respectively. On the other hand, if valid candidates have been found, continued processing and the actual signaling of the new connection may take place, as illustrated in FIG. 16.

Figure 16:
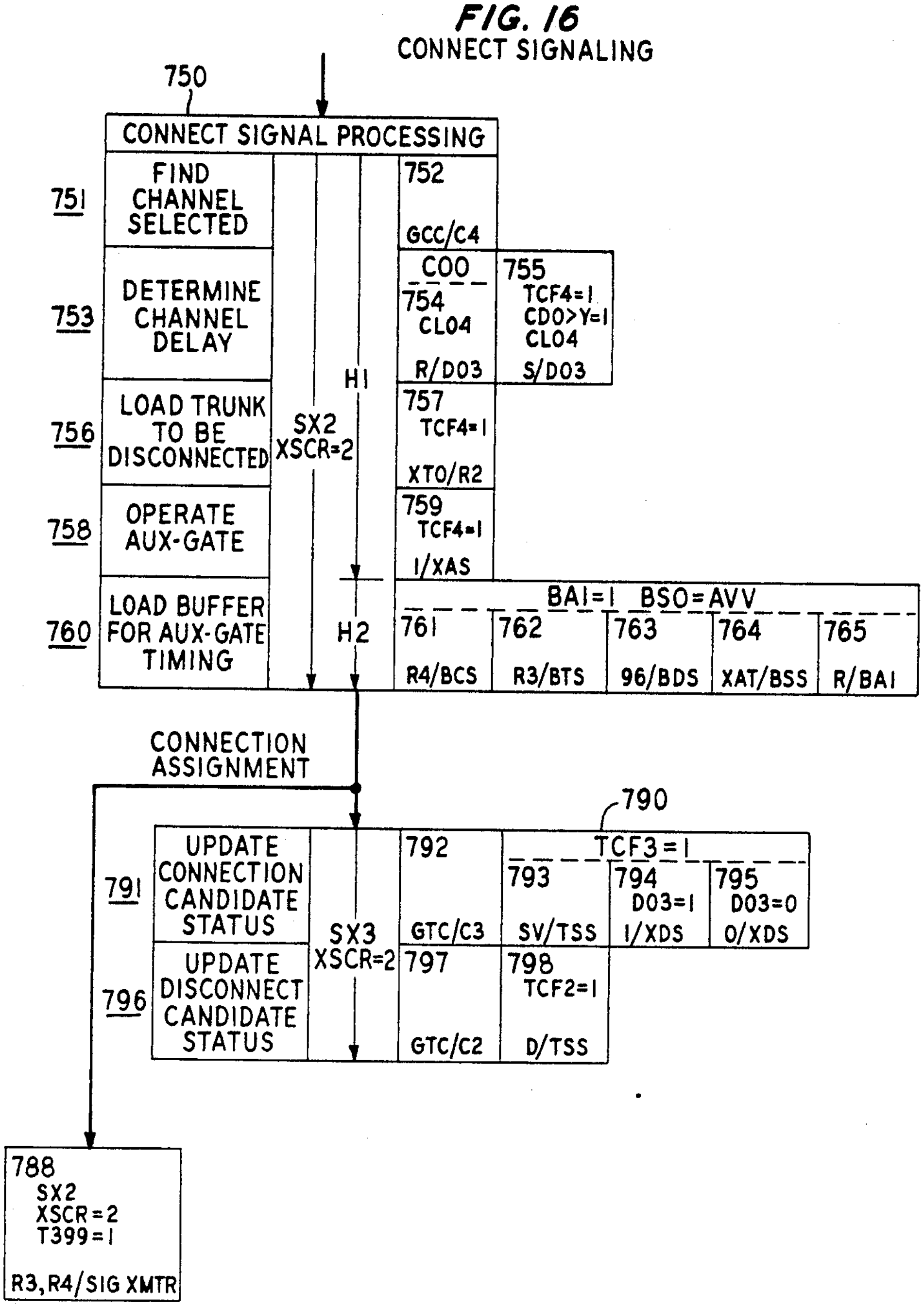
FIG. 16 is a flow or sequence chart of the connect signaling process used by the processing circuits of the interpolation system of FIG. 1.

In FIG. 16 the connect signaling process function 750 is shown. It will be noted that the entire connect signaling process is conditioned on the transmitting signaling control register (XSCR) having stored therein a "2" status, indicating that a new connect signal is being processed (TABLE V).

During the H1 channel scanning period of the XT2 trunk scanning period, the connect signaling process is initiated. At line 751, the channel which has previously been selected and placed in storage register R4 is compared to the generated channel codes (GCC/C4) in box 752 to identify the selected channel timeslot. At line 753 the appropriate channel delay is determined, using the DO3 flip-flop to store the selected delay (long or short). During the CLO4 clock phase of the COO channel timeslot, the DO3 flip-flop is reset (R/DO3) in decision box 754. In decision box 755, the selected channel timeslot pulse (TCF4=1) is used to set the DO3 flip-flop (S/DO3) only if that particular channel is a long channel (CDO > Y=1). At line 756 the trunk currently assigned to that channel is loaded into the R2 storage register (XTO/R2) in the selected channel timeslot (TCF4=1) in box 757.

The disconnection of the previously assigned trunk is initiated by operating the transmitting auxiliary gate 117 (FIG. 1) to disconnect the previously assigned trunk from the selected channel. In FIG. 16 this is accomplished by writing a "1" into the Transmitting Auxiliary gate Store 118 (1/XAS) during the selected channel timeslot (TCF4=1) in box 759. The auxiliary gate is a slow-to-release switch requiring approximately four milliseconds to completely release. This slow release prevents the generation of any audible click.

The next hundred microsecond trunk scanning period H2 is utilized to make all the necessary entries in the buffer stores shown in FIG. 9. As previously noted, these buffer stores are used to time the necessary preliminary operations before making connections. Thus, at line 760, the buffer stores are loaded for the purpose of timing the release of the auxiliary gate. The timeslot of the buffer store which is actually selected is selected from only those timeslots which are available as indicated by the AVV status in the buffer status store 473 (BSO=AVV). A buffer available BA1 flip-flop is used (BA1=1) to insure that a single entry is made in the buffer store. These two conditions are therefore necessary before the buffer loading at line 760 can be performed.

In box 761 the selected channel code is transferred (R4/BCS) from the R4 storage register to the buffer channel store 471 (FIG. 9). In box 762 the trunk selected for connection is written into (R3/BTS) the buffer trunk store 470 (FIG. 9). In box 763 a timing number "96", corresponding to 9.6 milliseconds, is written into the buffer delay store 478 (96/BDS). To indicate that auxiliary gate timing is taking place, the buffer status code XAT, for transmitter auxiliary gate timing, is written into the buffer status store 473 (XAT/BSS) in box 764. The BA1 flip-flop is reset in box 765 to insure only one assignment of this connection timing function.

During the last timeslot (T399=1) of the SX2 timing period, the trunk and channel codes for new connect signaling are transferred from storage register R3 (10-bit trunk word) and storage register R4 (8-bit channel word) are loaded into the signaling transmitter 112 of FIG. 1 (R3,R4/SIG.XMTR) in box 788. These codes are encoded in standard code formats and transmitted by way of the control signaling channels to the remote receiving terminal 101 (FIG. 1), utilizing standard signal transmission techniques. This pairing of a particular trunk code with a particular channel code constitutes a connection assignment which, when duplicated at both terminals of the TASI system, results in the identified trunk obtaining a complete connection through the identified channel. Further processing of these signals at the receiver will be taken up hereinafter.

The buffer store timeslot is now filled and is ready to initiate auxiliary gate timing. Before continuing into this timing cycle, however, certain bookkeeping operations are necessary.

In the next succeeding trunk scanning period (SX3), if a new connection is being signaled (XSCR=2), the trunk status codes are updated in function 790. At line 791 the trunk code in storage register R3 is compared with the generated trunk codes (GTC/C3) in box 792 to obtain a pulse in the appropriate timeslot (TCF3=1). This pulse is utilized in box 793 to write the status of the signaled trunk in the trunk status store 451 of FIG. 8 (SIG/TSS). At the same time, in box 794, a "1" is written into the transmitting delay store 456 (1/XDS) for a long channel connection (DO3=1) and, in box 795, a "0" is written into store 456 (O/XDS) for a short channel connection (DO3=0). At line 796 the disconnect candidate in the R2 storage register is likewise compared to the generated trunk codes (GTC/C2) in box 797 and the resulting timeslot pulse (TCF2=1) is used in box 798 to write the disconnected trunk status code into the trunk status store 451 (D/TSS).

The new connection having thus been signaled to the remote terminal, all that remains to be accomplished at the local terminal is to complete the auxiliary gate timing and make the actual connections of the new trunk to the selected channel. This is accomplished in FIG. 17.

Figure 17:
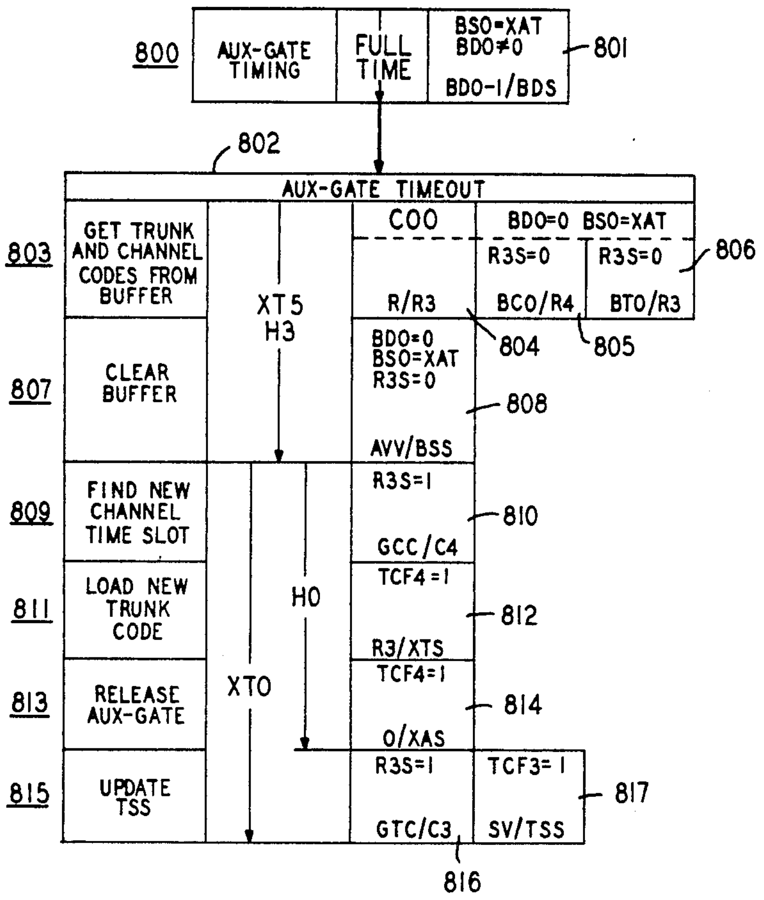
FIG. 17 is a flow or sequence chart of the auxiliary gate timing process used by the processing circuits of the interpolation system of FIG. 1.

In FIG. 17 there is shown the auxiliary gate timing function. At line 800 auxiliary gate timing takes place in box 801 by decrementing the timing code in the buffer delay store 478 (BDO-1/BDS). Such decrementing takes place at each recycling of buffer delay store 478, every 100 microseconds, if the buffer status indicates auxiliary gate timing (BSO=XAT) and the timing code has not yet reached zero (BDO O).

The auxiliary gate time-out function 802 takes place when the timing code in the buffer delay store 478 is decremented to zero (BDO=0). At line 803 the first action taken takes place during the H3 channel scanning period of the XT5 trunk period. During the COO channel timeslot, storage register R3 is reset (R/R3) in box 804. If the buffer delay code is equal to zero (BDO=0), and if the buffer status code indicates transmitting auxiliary gate timing (BSO=XAT), then the R3 and R4 storage registers are used to receive the trunk and channel codes from the buffer register. Register R3 status (R3S) is used to interlock this time-out so that only one will be serviced at a time. In box 805 if the R3 storage register has been reset (R3S=0), the channel code is written into the R4 register (BCO/R4). Moreover, if the R3 storage register has been reset (R3S=0), the trunk code is transferred from the buffer trunk store 470 to the R3 storage register (BTO/R3) at box 806.

It will be noted that the transmitting auxiliary gate is turned OFF as soon as the new connection decision is made (decision box 759, FIG. 16). It will be turned ON again only after the new trunk code is stored in transmitting trunk store 111 (FIG. 1). As previously noted, the total delay provided is approximately 10 milliseconds.

Returning to FIG. 17, at line 807 the buffer store is cleared in box 808 (AVV/BSS) at the same time (BDO=0;BSO=XAT;R3S=0) that the trunk and channel codes are recovered from the buffer store at line 803. At line 809 during the HO channel period of the next XTO trunk scanning period, while queue updates are taking place (FIG. 14), the contents of the R4 storage register are compared to the generated channel codes (GCC/C4) in box 810. At line 811, the timeslot pulse thus obtained (TCF4=1) is used in box 812 to load the trunk code (in the R3 storage register) into transmitting trunk store 111 (R3/XTS). The transmitting terminal is now prepared to connect the new trunk to the assigned channel. At line 813, however, it is necessary first to release the auxiliary gate in transmitting auxiliary switch 117. This is done in box 814 simply by writing a "0" into the transmitting auxiliary gate store 118. About 4 milliseconds later, the auxiliary gate is fully released and the new connection is completed at the transmitting terminal. At line 815 the trunk status store 451 is updated. In box 816 the trunk code in storage register R3 (R3S=1) is compared to the generated trunk codes (GTC/C3) and, in box 817, when the time-slotted compare signal appears (TCF3=1), the trunk status code is changed to indicate that that trunk is receiving service (SV/TSS).

It should be noted that, during the auxiliary gate time-out illustrated in FIG. 17, the new connection control arrangements of FIGS. 14 and 15 continue to operate, attempting to select a new connection every 2.4 milliseconds. Since auxiliary gate timing, like all other timing in this system, is done by decrementing digital timing codes in timeslots assigned to specific connections, a plurality of such timing cycles may be going on concurrently.

The entire new connection process which takes place at the transmitting terminal has now been described. It is necessary, however, to duplicate this connection at the receiving terminal in response to the connection signals transmitted by signaling transmitter 112 over the reserved control channels. The receiver processing cannot, of course, begin until the connection signals are received. Moreover, the actual connections at the receiving terminal must not only duplicate the trunk-channel assignment made at the transmitting terminal but must also be delayed sufficiently to permit all signals from the old connection to be delivered to the old trunk. Since transmission channels of various delays may be used in the TASI system herein described, each connection at the receiver must reflect the particular delay associated with the channel being switched. The means for accomplishing this variably delayed connection switching forms the subject matter of the present invention and will be described in greater detail in connection with FIGS. 18 and 19.

The TASI receiver is slave to the TASI transmitter in the sense that all connection assignments are made at the transmitter and then merely duplicated in the receiver. Receiver processing is therefore very brief, being completed within 1.2 milliseconds of the reception of a new connection assignment. The receiver circuits are thereafter restored to a "waiting" state, awaiting further signals.

In addition to signaling for new connections, the control channels are also used for certain error correction signals and various other test or control signals (messages). It is therefore necessary at the receiver to first ascertain that new connection data has been received. This function will be described in connection with FIG. 18.

Figure 18:
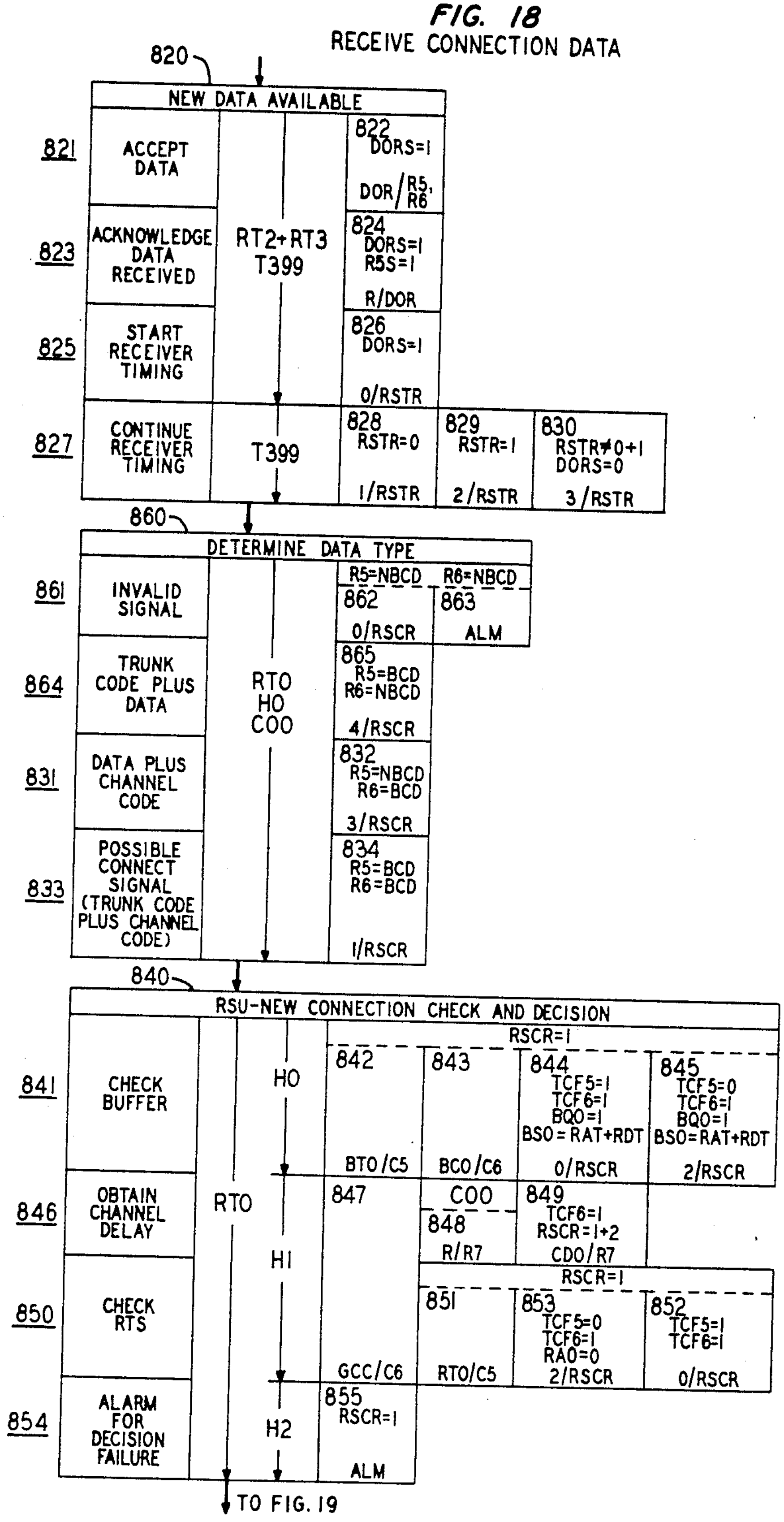
FIG. 18 is a flow or sequence chart of the receive connection data process used by the processing circuits of the interpolation system of FIG. 1.

In FIG. 18 the new data available function 820 includes at line 821 the subfunction of accepting data. The presence of data is indicated by a Decoder Output Register Status signal (DORS=1) during the last trunk timeslot (T399) of either the RT2 or the RT3 trunk scanning period. In this connection, the RTO through RT3 timing periods correspond to the XTO through XT3 timing periods but are used by the receiving terminal rather than by the transmitting terminal. At line 821, if new data is available (DORS=1), this new data is written into the R5 (trunk code) and R6 (channel code) storage registers from the decoder output register (DOR/R5,R6) in box 822. At line 823, the receipt of the data is acknowledged by resetting the decoder output register (R/DOR) in box 824.

Since a minimum of 1.2 milliseconds is required for receiver processing, data is received only in the final microsecond of each 400 microsecond trunk scanning interval. In this way, receiver processing in progress is not interrupted. Receiver timing is then started with the acceptance of new data. The RT*n* intervals are generated by changing the state of a control register designated the received signal timing register (RSTR) each 400 microseconds. Thus, period RTO is actually (RSTR=0). However, since these intervals are equivalent to the familiar XT*n* intervals at the transmitter, the RT*n* designations are utilized to take advantage of this familiarity. Once started by the arrival of new data, receiver timing continues automatically through the RTO, RT1 (RSTR=1) and RT2 (RSTR=2) trunk timing periods required to make up the 1.2 millisecond receiver data processing cycle. Thereafter, if no new data is immediately available, the timing period changes to RT3 (RSTR=3) and remains in this timing period until new data does become available. The condition (RT2+RT3) therefore represents the last portion of the processing period or the "awaiting data" condition.

At line 825, the receiver timing is started by writing "0" into the received signal timing register (O/RSTR) in box 826 when data is present (DORS=1). In line 827, the receiver timing is continued by advancing the RSTR register during the T399 timeslot of each 400 microsecond timing period. Thus, in box 828 the timing status is advanced from "0" (RSTR=0) to "1" (1/RSTR) in the next succeeding T399 timeslot pulse. Similarly, in box 829, the timing status is advanced from "1" to "2". In box 830 the timing status is set at "3" (3/RSTR) if the timing status is not already a "0" or a "1" (RSTR 0+1), and no new data is available (DORS=0).

Function 860 determines the data type of the data just received. At line 861 the signals in storage register R5 and R6 are examined by BCD detectors of the type shown as detector 311 in FIG. 5. If neither the signal in register R5 (R5=NBCD) nor R6 (R6=NBCD) are binary coded decimal codes, an invalid signal has been received. Under these conditions, in box 862 a "0" is set into the received signal control register (0/RSTR), indicating that processing has been completed. Such invalid signals cannot be used by the TASI system and must be ignored. In box 863 an alarm is sounded to alert the attendant personnel that an invalid code has been received.

If either the trunk code or the channel code is BCD, a valid signal has been received. The valid BCD code represents either a trunk or a channel depending on its presence in storage register R5 or R6, respectively. The accompanying non-binary coded decimal (NBCD) signal constitutes specific information about the identified trunk or channel. A received signal control register RSCR is set to an appropriate state to reflect each of these conditions. Thus, at line 864, in box 865, the RSCR register is set to "4" (4/RSCR), while at line 831 in box 832 the RSCR register is set to "3" (3/RSCR). These two conditions of the RSCR register can be used to control appropriate processing of the received signals. Such processing will not be described here since it forms no part of the present invention.

At line 833, the possible connect signal is detected by indications that the contents of both registers R5 and R6 are BCD (R5=BCD; R6=BCD). In box 834, the resulting action is to set the RSCR register to "1" (1/RSCR). The status indications of the RSCR control register are summarized in Table VI.

TABLE VI

Receiving Signaling Control Register (RSCR)

| Code | Description |
|---|---|
| RSCR=0 | RSU (Processing Complete) |
| 1 | Connect Signal - RSU Determination |
| 2 | Connect Signal Processing |
| 3 | Channel Data Processing |
| 4 | Trunk Data Processing |

There are three possible situations in which connection signals might be received in the TASI system of FIG. 1. The first and most obvious is that described above for new connections. Also, repeat connection signaling is sent over the other control channel shortly after the initial new connection signaling to reduce the likelihood of erroneous assignments. Still further error correction is accomplished by so-called receiver store update (RSU) signals. The RSU signals comprise sequential transmission of the entire contents of the transmitting trunk store 111 on a one-at-a-time sequential basis when the signaling channels are not required for either new connection or repeat connection signaling. The form of the connection signals themselves, however, are identical in all of these cases. It is necessary only to determine if the connection is in fact new or not. This determination is done in function 840 in FIG. 18.

At line 841 of function 840, the newly received trunk and channel identifications are compared to the contents of the buffer trunk and buffer channel stores 470 and 471, respectively, in FIG. 9. This is accomplished in boxes 842 (BTO/C5) and 843 (BCO/C6), provided the codes are BCD codes (RSCR=1). If the new channel is found in the BCS store 471 (TCF6=1) and if the buffer status shown indicates either receiver delay timing or receiver auxiliary gate timing (BSO=RDT+RAT), then the new channel should also be found at least once with the buffer queue store entry of "1" (BQO=1) since this should be the latest assignment of that channel. If both the new channel and the new trunk codes are already stored in the same timeslot of the buffer store (TCF5=1; TCF6=1), this connection information has already been received and is in the process of being utilized. This being so, no error exists. The connection repeat or RSU signal has therefore served its function and the RSCR register is returned to state "0" (0/RSCR) in box 844, indicating that processing of the received signals is complete.

If the trunk and channel codes are not assigned the same slot in the buffer store of FIG. 9 (TCF5=0; TCF6=1), it is assumed that a new or corrected connection signal has been received and the RSCR register is set to the "2" state (2/RSCR) in box 845 to initiate new connection processing. If connection processing has proceeded beyond the buffer store stage, the received signals may still be RSU signals. Processing is nevertheless continued as if new signals had been received, subject to later cancellation.

During the next 100 microsecond interval (H1), at line 846 the appropriate channel delay for the received channel code is ascertained. In box 847 the channel code in register R6 is compared to the generated channel codes (GCC/C6). In box 848, during the COO channel timeslot, the storage register R7 is reset (R/R7) in preparation for the receipt of a channel delay code. In box 849, during the appropriate channel timeslot (TCF6=1), and assuming that connection processing should be continued (RSCR=1+2), a delay code associated with that channel is loaded into storage register R7 (CDO/R7). It will be noted that the channel delay store 510 in FIG. 10 has stored in each timeslot a digital code corresponding to the inherent delay of the associated channel. These delay codes are generated by actually measuring the transmission delay of each of the various channels, converting these delays to digital codes, and storing them in the CDS store 510.

At line 850, the RSU-new connection check is continued by checking the receiver trunk store 116′ to ascertain if this connection is already being made. Thus, in box 851, the trunk code in register R5 is compared to the contents of receiver trunk store 116′ during the H1 timing period. If the trunk code is discovered in the receiving trunk store (TCF5=1) during the same timeslot as that corresponding to the channel code in register R6 (TCF6=1), then the received signal is an RSU signal which is no longer needed and, in box 852, the RSCR register set to "0" (0/RSCR). If this match does not occur (TCF5=0; TCF6=1), and if the receiving auxiliary gate is closed (RAO=0), it is assumed that the signals represent a new connection and processing continues by advancing the state of the RSCR register to "2" (2/RSCR). At line 854, an alarm is generated if no decision has been made before the H2 timing period, as indicated in box 855 by the RSCR register continuing in the state "1" (RSCR=1).

It is assumed that, after the processing described in connection with FIG. 18, the received signals do indeed represent a new connection. The balance of the processing, described with reference to FIG. 19, therefore assumes that a new connection is indeed present. It will be noted that repeat signals or RSU signals which do not coincide with existing assignments at the receiver indicate that an error has occurred. Such errors are corrected simply by treating the received signals as if they were new connection signals and altering the assignments at the receiver in accordance therewith. In general then, errors are corrected both on repeat signals and RSU signals simply by writing the later received assignments in place of the erroneous assignments, using the same processing arrangements as are normally used for new connection signals.

In FIG. 19, the new connection processing function 900 begins at line 901 by updating the buffer queue during the H2 phase of the RTO timing period. At box 902, the channel code stored in the R6 storage register is compared with the buffer channel store 471 (BCO/C6). If this channel code is already in the buffer channel store 471 (TCF6=1) for auxiliary gate or delay timing (BSO=RAT+RDT), then the last entry mark in buffer queue store (BQS) 472 is changed to a "0" (0/BQS) in box 903. In this way the "1" signal in the BQS store 472 can be reserved to identify only the latest channel entry in the buffer channel store 471.

At line 904, the new assignment is loaded into the buffer stores under the control of a buffer access flip-flop BA1. During the H3 timing period, the trunk codes in storage register R5 are loaded into the buffer trunk store 470 (R5/BTS) in box 905. The channel code in the R6 storage register is loaded into the buffer channel store 471 (R6/BCS) in box 906, and this buffer timeslot is marked as the last entry in the buffer queue store 472 (1/BQS) in box 907. The BA1 register is reset in box 908 (R/BA1) to insure entry into only a single timeslot.

At line 909, the receiver delay timing (RDT) status is written into the buffer status store 473 of FIG. 9 (RDT/BSS) in box 910, provided the buffer access flip-flop is set (BA1=1). If a delay code has been loaded into the R7 storage register (R7  0), the contents of the R7 register are loaded into the buffer delay store 478 (R7/BDS) in box 911.

The receiver delay timing function 912 takes place continuously whenever an RDT status exists in the buffer status store (BSO=RDT). So long as the buffer delay output has not reached zero (BDO  0), a timing pulse (GC1.2M=1) is used to decrement the timing code in buffer delay store 478 (BDO-1/BDS). The time-out of this code will be described hereinafter.

At line 913, if the RDT timing code has been exhausted, or if no delay timing is required (R7=0), then receiver auxiliary gate timing (RAT) is in order. The receiver auxiliary timing status is loaded into the buffer status store (RAT/BSS) in box 914 and a timing code of "40" is loaded into the buffer delay store (40/BDS) in box 915. Function 916 decrements the auxiliary gate timing code (BDO-1/BDS) if the buffer status indicates receiver auxiliary gate timing (BSO=RAT) until the buffer delay code reaches zero (BDO  0).

At line 917, the auxiliary gate is operated by comparing, in box 918, the new channel code in storage register R6 with the generated channel codes (GCC/C6). In the timeslot assigned to that channel (TCF6=1), the receiver auxiliary gate is opened in box 919 (1/RAS).

At line 920, the receiver delay store 457 (FIG. 8) is updated by comparing, in box 921, the new trunk code in the R5 storage register with the generated trunk codes (GTC/C5). In the appropriate trunk timeslot (TCF5=1), a "0" or a "1" is written into the receiver delay store 457 (FIG. 8), depending on the delay code assigned to that channel. Thus, in box 922, if the delay is not greater than some preselected amount (R7>Y=0) indicating a "short" channel, a "0" is written into the receiving delay store (0/RDS). Conversely, if the delay code exceeds the preselected value (R7>Y=1) indicating a "long" channel, then a long channel indication "1" is stored in the receiving delay store 457 (1/RDS).

The channel delay and receiver auxiliary gate time-out functions are shown as functions 930 and 931, respectively. In function 930, at line 932, receiver delay time-out (BDO=0) is recognized during the H0 or H2 phases of the RT1 or RT3 timing periods. In box 933, during the C00 timeslot, the R6 storage register is reset (R/R6). Once the R6 register is reset (R6S=0), and provided the receiver delay timing status is in effect (BSO=RDT), then the channel code is transferred at box 934 from the buffer channel store 471 (FIG. 9) to the R6 storage register (BCO/R6). At the same time, in box 935, the buffer status is changed to auxiliary gate timing (RAT/BSS) and the auxiliary gate timing code is loaded into the buffer delay store 478 (40/BDS) at box 936. At line 937, during the following H1 or H3 timing phase, the auxiliary gate is operated. This is accomplished by comparing the contents of the R6 storage register if R6 is occupied (R6S=1), to the generated channel codes (GCC/C6) in box 938, and, in box 939, in the identified timeslot (TCF6=1), writing a "1" into the receiver auxiliary gate store 120' (1/RAS). The auxiliary gate time-out begins at box 939 in the same fashion as described in connection with line 913 above.

The auxiliary gate time-out function 931 is similar to the delay time-out. At line 940, during the H0 or H2 phase of the RT1 or RT3 timing periods, storage register R5 is reset (R/R5) in box 941. When the R5 storage register is reset (R5S=0) and time-out has occurred (BDO=0) during auxiliary gate timing status (BSO=RAT), the channel code is transferred from the buffer channel store 471 (FIG. 9) to the R5 storage register (BCO/R5) in box 942. In box 943, the trunk code in the buffer trunk store 470 (FIG. 9) is similarly transferred to the R7 storage register (BTO/R7). In box 944, the available status is written into the buffer status store 473 (AVV/BSO).

At line 945, the connection is completed by updating the receiving trunk store (RTS) 116' and receiving auxiliary gate store (RAS) 120' (FIG. 1). Thus, during the following H1 or H3 timing phase, in box 946, once the R5 storage register has been loaded (R5S=1) with the new channel code, that channel code is compared to the generated channel codes (GCC/C5). In the compare timeslot (TCF5=1), the trunk code in the R7 storage register is transferred to the receiving trunk store 116' (R7/RTS) in box 947. At the same time, the receiving auxiliary gate is closed by writing a "0" into the receiving auxiliary gate store 120' (0/RAS) in box 948.

The new connection is now complete at the receiver as well as at the transmitter. It will be noted that the delay codes from the channel delay store 510 (FIG. 10) were utilized to delay the completion of each connection by an amount related to the transmission delay of the associated channel. In this way, cross connections were prevented by allowing delayed speech signals to be delivered to the previous listener before switching the channel to the new listener. In accordance with the present invention, this present channel delay function prevents cross connections while requiring no analog delays to be inserted in the speech paths.

It is to be understood that the above-described arrangements are merely illustrative of the numerous and varied other arrangements which may constitute applications of the principles of the invention. Such other arrangements may be readily devised by those skilled in the art without departing from the spirit and scope of this invention. The principles of the invention may, for example, be applied to digital data signals as well as analog voice signals, and may utilize any appropriate apparatus for storing and processing the described signals.

What is claimed is:

1. A remotely-controlled switching system comprising
   - a plurality of transmission channels of different lengths,
   - a plurality of signal sources,
   - means for connecting active ones of said signal sources to said transmission channels,
   - means, utilizing a selected one of said transmission channels, for identifying each source-channel connection to a remote receiving station, and
   - means at said receiving station for duplicating the identified connections, but delayed by an interval proportional to the respective lengths of the different channels.

2. The remotely controlled switching system according to claim 1 comprising
   - common control processing circuits for selecting a transmission channel for each said active signal source,
   - time division switching means for interconnecting said transmission channels, and
   - circulating digital stores for storing digital connection control information in time separated timeslots.

3. The remotely controlled switching system according to claim 1 wherein said transmission channels include a submarine communications cable.

4. The remotely controlled switching system according to claim 1 wherein said transmission channels include a communications satellite station.

5. The remotely controlled switching system according to claim 1 wherein said signal sources comprise telephone subscribers' lines.

6. The remotely controlled switching system according to claim 1 wherein said means for connecting sources to channels includes
   - means for selecting currently active signal sources as candidates for connection,
   - means for selecting currently unused transmission channels as candidates for disconnection, and
   - means responsive to the respective delay times of the new and old channels for assigning the connection candidate to the disconnection candidate.

7. The remotely controlled switching system according to claim 6 further including means for selecting said candidate for connection from a queue of signal sources requiring a connection.

8. The remotely controlled switching system according to claim 6 further including means for selecting said candidate for disconnection from a queue of signal sources no longer requiring a connection.

9. The remotely controlled switching system according to claim 6 further including means for selecting said candidate for disconnection on a priority basis in the following order of priority;
   - first, selecting a channel previously withdrawn from service for maintenance,
   - second, selecting a channel connected to a signal source which has been disconnected from said switching system, and
   - third, selecting a channel connected to an inactive signal source.

10. A multiplex transmission system comprising
    - a transmission facility including a plurality of diverse transmission paths of differing transmission delays,
    - a plurality of signal sources competing for said transmission paths,
    - transmission switching means for connecting active signal sources to said transmission paths,
    - separate and independent signal paths for signaling each connection of said active signal sources to said transmission paths, and
    - receiving switching means for delaying the connection of signal receivers, corresponding to said signal sources, to said transmission paths for a period proportional to the respective delays of said transmission paths.

11. A time assignment speech interpolation system comprising a plurality of signal sources and corresponding remote signal utilization circuits, a lesser plurality of transmission channels having different delay times, switching means for connecting active ones of said signal sources to available ones of said transmission channels on a time division basis, signaling means for identifying all signal source-transmission channel connections, and means responsive to said signaling means for delaying the connection of each transmission channel to the corresponding signal utilization circuit for a period substantially equal to the delay time of that transmission channel.

12. In a time assignment speech interpolation system having a plurality of signal sources and a lesser plurality of transmission channels means for assigning active sources to available channels on an instantaneous time assignment basis, means for transmitting said assignments to a remote terminal for duplicating said assignments at said remote terminal, and means at said remote terminal for delaying each of said assignments for a period equal to the transit time delay of the corresponding channel.

* * * * *